United States Patent [19]
Fandrianto et al.

[11] Patent Number: 5,982,459
[45] Date of Patent: Nov. 9, 1999

[54] INTEGRATED MULTIMEDIA COMMUNICATIONS PROCESSOR AND CODEC

[75] Inventors: Jan Fandrianto, Los Gatos; Bryan R. Martin; Doug G. Neubauer, both of Campbell; Duat H. Tran, San Jose; Matthew D. Cressa, San Carlos; Arijanto Soemedi, Sunnyvale, all of Calif.

[73] Assignee: 8x8, Inc., Santa Clara, Calif.

[21] Appl. No.: 08/872,858

[22] Filed: Jun. 11, 1997

Related U.S. Application Data

[62] Division of application No. 08/457,516, May 31, 1995, abandoned.

[51] Int. Cl.⁶ .............................. H04N 7/12; H04N 5/14
[52] U.S. Cl. ..................... 348/845.2; 348/554; 348/571; 348/384
[58] Field of Search ..................................... 348/384, 390, 348/426, 423, 845, 845.2, 554, 553, 571, 714, 725; 345/327, 328; 320/394

[56] References Cited

U.S. PATENT DOCUMENTS

| | | |
|---|---|---|
| 5,339,076 | 8/1994 | Jiang . |
| 5,351,208 | 9/1994 | Jiang . |
| 5,379,351 | 1/1995 | Fandrianto et al. . |
| 5,483,287 | 1/1996 | Siracusa ................................. 348/426 |
| 5,517,250 | 5/1996 | Hoogenboom et al. ................ 348/467 |
| 5,559,999 | 9/1996 | Maturi et al. ............................ 395/550 |
| 5,594,813 | 1/1997 | Fandrianto et al. . |
| 5,668,601 | 9/1997 | Okada et al. ............................ 348/423 |

OTHER PUBLICATIONS

Fandrianto, et al., "A Programmable Solution for Standard Video Compression", *COMPCON Spring '92 IEEE Computer Society Int'l Conference*; pp. 47–50, ©1992.

Bailey et al., "Programmable Vision Processor/Controller", *IEEE Micro*, vol. 12, Issue 5, pp. 33–39 (1992).

*Primary Examiner*—Victor R. Kostak

[57] ABSTRACT

A multimedia processor contains a general purpose RISC and video processors which operate in parallel to execute software for combined video and audio bit stream coding and decoding. The RISC processor controls operation of the multimedia processor and performs bit stream parsing and coding, audio compression and decompression, and general processing for embedded applications. The video processor performs video encoding and decoding functions such as scaling, filtering, decimation, and DCT transforms. The RISC processor and the video processor each have separate data buses which are interconnected through a portal circuit and a Huffman codec. Each data bus has a DMA controller which transfers data to and from a memory interface to an external memory. DMA channels serve I/O interface resources coupled to the data buses and can form buffers in the external memory. This reduces the need for on-chip FIFO buffers and separate buffers between the multimedia processor and attached devices.

20 Claims, 20 Drawing Sheets

Fig. 2 VCP BLOCK DIAGRAM

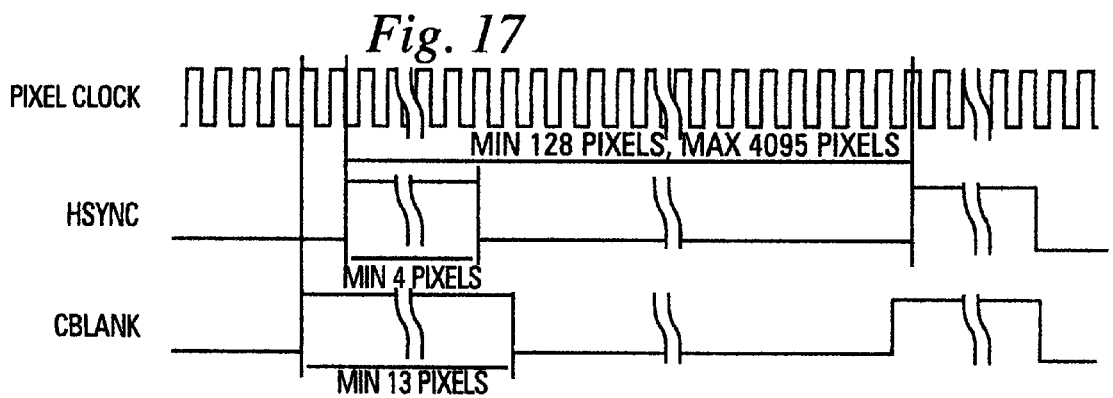
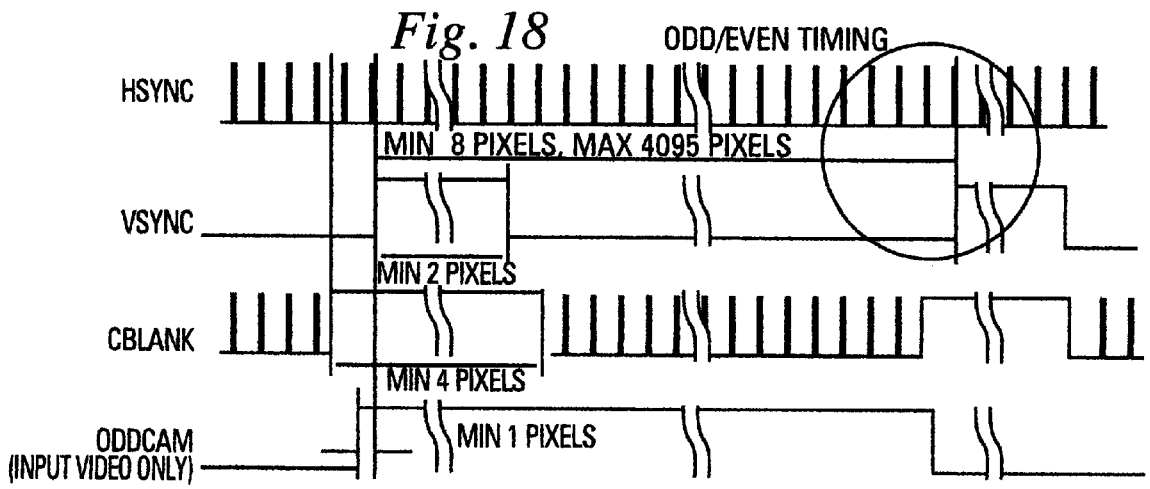
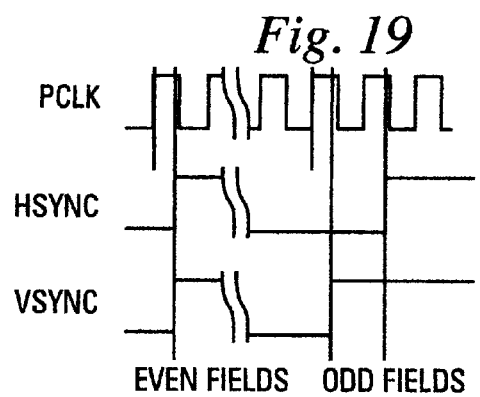

INTEGRATED MULTIMEDIA COMMUNICATIONS PROCESSOR AND CODEC

"This is a divisional of application Ser. No. 08/457,526, filed May 31, 1995, now abandoned which applications(s) are incorporated herein by reference."

FIELD OF THE INVENTION

This invention relates to video coders and decoders and in particular to a programmable video codec capable of processing both video and audio signals.

BACKGROUND OF THE INVENTION

Integrated circuits which process video signals are available for use in multi-media applications. For Ad example, an integrated circuit such as a conventional video decoder converts a video signal complying with a particular video protocol to data for a computer or a signal for a monitor. However, many different systems process both video and audio signals and use a variety of different standards and protocols. Each system typically requires one or more integrated circuits (signal processors) designed for coding or decoding of the particular standard or standards handled by the system. In particular, prior art integrated circuits are typically custom manufactured to implement standards such as MPEG, MPEG2, JPEG, H.320 or H.32P. Additionally, video and audio are conventionally processed by separate integrated circuits because video and audio use different protocols which present different processing problems. Having a special digital processors designed and fabricated for video and audio and each of the different protocol increases design, manufacturing and stocking costs and decreases the flexibility of the digital processors.

SUMMARY OF THE INVENTION

In accordance with this invention, a universal circuit for video and audio compression and decompression is provided for use with any of the presently established standards. In accordance with one embodiment of this invention, the universal multimedia computer communications processor is fabricated on a single integrated circuit chip and is capable of processing not only video signals but also audio signals in accordance with user selected standards.

In one embodiment, an integrated multimedia processor executes user programmable software to implement the desired standard. The multimedia processor includes parallel processing units including a RISC processor, a video processor, and hardware resources for implementing specialized encoding and decoding tasks. The RISC and video processors are independently programmable. The RISC processor and associated hardware implement communications protocols for video conferencing, perform bit stream parsing (decoding) or construction (encoding), control audio processing and output, and transfer (decoding) or receive (encoding) video data to the video processor. The video processor and associated hardware units performs video processing operations such as video scaling, DCT (discrete cosine transform), inverse DCT, temporal filtering, output interpolation, color conversion, and picture-in-picture.

To provide efficient co-operation of parallel operations, one embodiment of the invention includes two separate data buses (one connected to the RISC processor and one to the video processor). A portal circuit and a Huffman codec for transfer data between the two buses. Each data bus has a DMA unit and an interface for an external memory. An external memory coupled to the data bus on the RISC side contains a program for execution by the RISC and space for data buffers. The DMA on the RISC side monitors input and output of data through a set of standard input/output interfaces and automatically transfers data to buffers in the external memory. Accordingly, the multimedia processor can be coupled to asynchronous data sources without intervening FIFO buffers.

DESCRIPTION OF THE DRAWINGS

FIGS. 17, 18, and 19 are timing diagrams which illustrate relationships among a pixel clock signal and horizontal and vertical sync signals.

Use of the same reference symbols in different figures indicates similar or identical items.

DETAILED DESCRIPTION OF THE PREFERRED EMBODIMENTS

A video communications processor (VCP) in accordance with the invention is a single-chip programmable video codec and multimedia communications processor suitable for a variety of applications. The VCP requires only memory and interface circuits for implementation of a complete multimedia and conferencing subsystem. In one video conferencing application, the VCP acts as a full CIF (common interchange format) resolution, H.261 codec with forward error correction and audio/video bit stream multiplexing and demultiplexing according to the H.320 which includes the H.221, H.230, H.242, H.243, and H.261 digital communication standards described in recommendations from the CCITT (International Telegraph and Telephone Consultation Committee). For one video playback application, the VCP decodes the MPEG system protocol and MPEG 1 and MPEG 2 standard video. (MPEG is the "Moving Pictures Experts Group" of the ISO/IEC which, in ISO/IEC JTC1 SC29 committee draft ISO 11172 of January 9, 1992, propagated audio/video standards referred to herein as MPEG 1 and MPEG 2.) In addition to multiplexing and codec functions, the VCP provides programmable video pre-processing and post-processing functions including video scaling, temporal filtering, output interpolation, color conversion, and picture-in-picture for all of the above mentions video standards.

Figure 1:
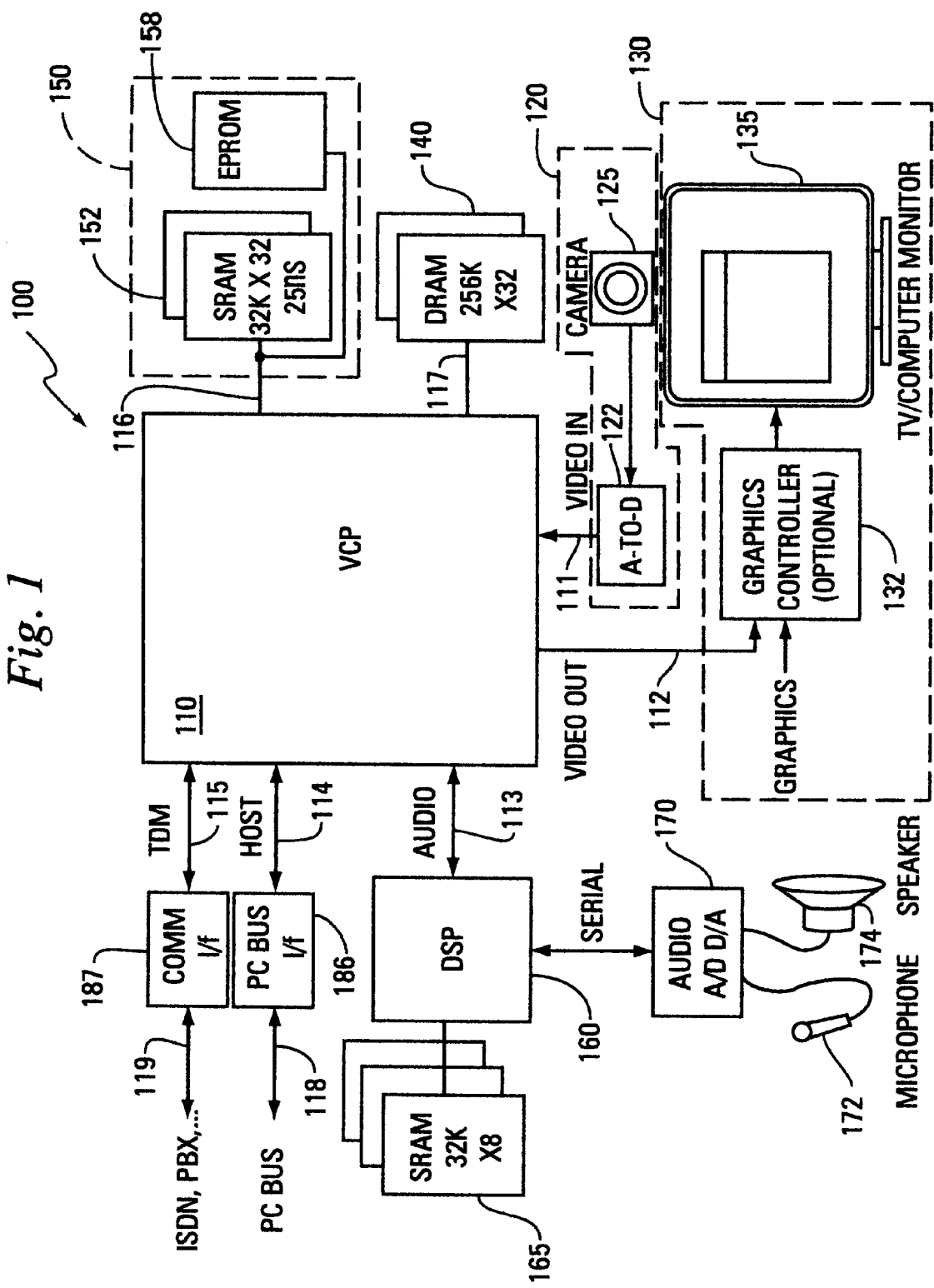
FIG. 1 is a block diagram of a system employing a video compression processor in accordance with an embodiment this invention.
Figure 2:
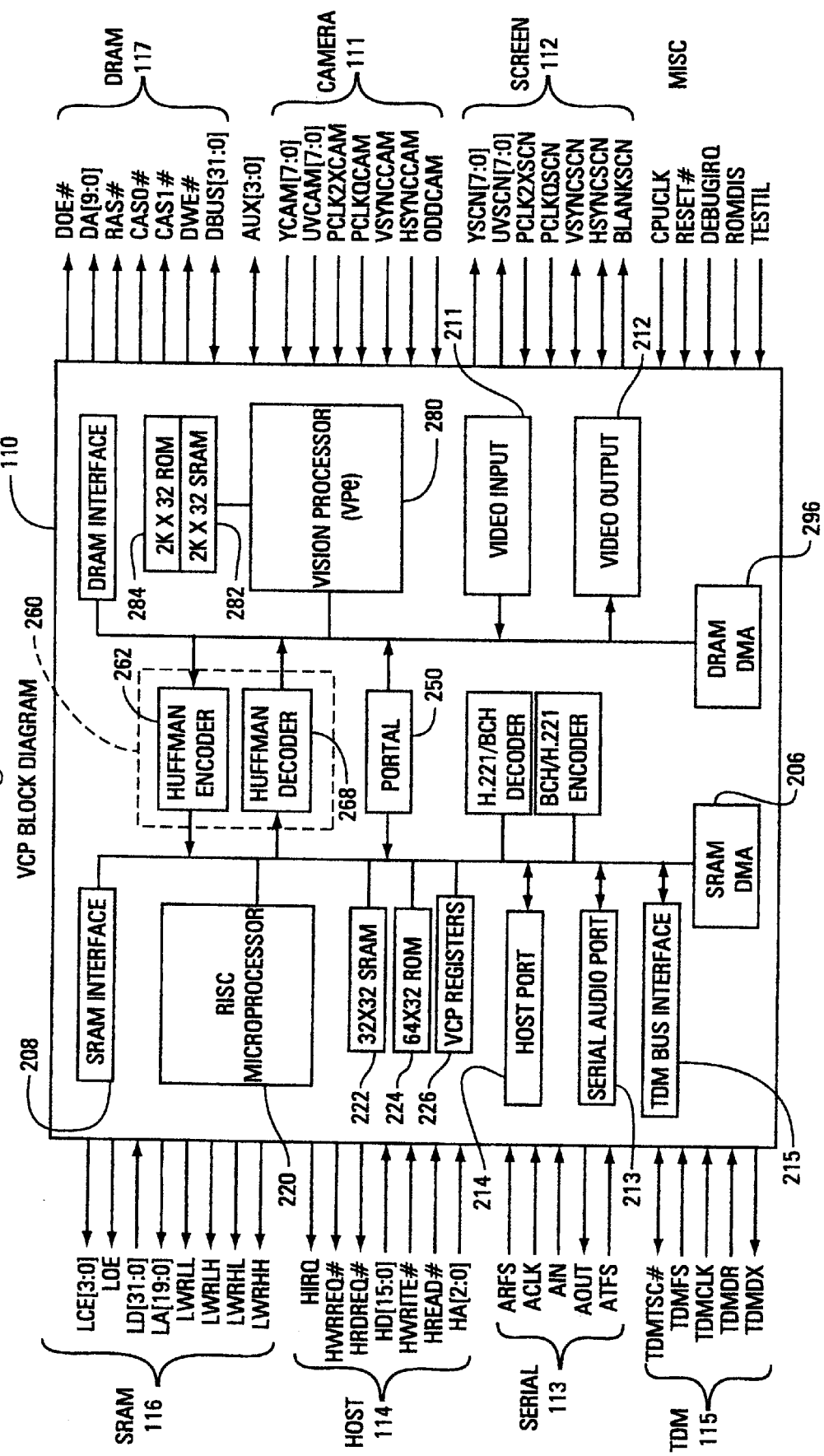
FIG. 2 illustrates a block diagram of the video communications processor of FIG. 1.

FIG. 1 shows a block diagram of a typical multi-media system 100 containing a VCP 110. FIG. 2 shows a block diagram of an embodiment of VCP 110 and is described in conjunction with FIG. 1. VCP 110 has several interfaces for input and output of audio, video, and other data. A video input interface 211 and a video output interface 212 handle digital video signals and are connected via video input and output buses 111 and 112 to video capture and display circuits 120 and 130. Video capture circuit 120 includes a source of a digital video signals such as an analog-to-digital converter (ADC) 122 which is connected to a conventional video camera 125. Video display circuit 130 includes a graphic controller or digital-to-analog converter (DAC) 132 connected between video output interface 212 and a television, LCD panel, or monitor 135. In workstation applications, video output interface 212 feeds an overlay circuit so that the output video appears in a window of the graphical user interface. DAC 132 converts digital video signals to an analog form such as RGB, PAL, or NTSC as appropriate for monitor 135.

An audio interface 213 is for serial input and output of digital audio data. Audio interface 213 connects via a bus 113 to an audio DSP 160 and in one embodiment of the invention has IOM-2 (ISDN Oriented Modular Revision 2), MVIP (Multi-Vendor Integral Protocol), and CHI (concentration highway interface) bus capabilities. DSP 160 performs audio processing and controls audio input/output devices such as an audio codec 170 connected to a microphone 172 and a speaker 174.

A host interface 214 and a TDM interface 215 handle input and output of compressed digital signals which represent video, audio, user defined, and other data. Host interface 214 is for connection of a host device such as a host processor (not shown) in a personal computer system. The host processor can transmit compressed audio/video data to, or receive data from VCP 110 via a host bus 114 and a local bus 118 such as an ISA, VESA, or PCI bus. TDM interface 215 is a time division multiplexed interface for connection via a bus 115 to a modem and PSTN phone lines, ISDN lines, or devices such as CD-ROM drives which provide a time division multiplexed serial bit stream.

One exemplary application of VCP 110 is an audio/video board for connection to a 16-bit ISA bus slot of an IBM or compatible personal computer. In the exemplary embodiment, an ISA bus interface circuit 186 provides an address decode circuit and a 16-bit data buffer for connection to an ISA bus of a host computer. Video ADC 122 is an SAA7110 NTSC decoder available from Phillips Semiconductor, Inc. which receives a NTSC video signal via an external connector on the codec board. DAC 132 is a Bt885 video DAC, available from Brooktree Corporation that provides a video signal for a VGA monitor. DSP 160 and audio codec 170 are an AD2171 digital signal processor available from Analog Devices, Inc. and a CS4215 audio codec available from Crystal Semiconductor, Inc. Compressed bit streams from the board can be transferred via DMA across the ISA bus to a disk or a network card in the host. Alternatively, the bit stream can be transferred to an external communications card using a MVIP compatible interface through TDM interface 215.

As shown in FIG. 2, VCP 110 contains two main programmable processing units, a RISC processor 220 and a video processor 280, and processing resources 240 and 250 which perform specific processing tasks. With appropriate software, VCP 110 encodes or decodes video and audio data in compliance with H.261, MPEG 1, MPEG 2, or custom proprietary compression standards.

RISC processor 220 supervises hardware resources for input and output of compressed data, error correction and error correction coding, parsing bit streams, and interleaving audio and video data to form a bit stream. The address space of RISC processor 220 includes an internal ROM 224, an external memory 150, an internal SRAM 222, VCP registers 226, and a portal circuit 250. Internal ROM 224 contains a boot routine that RISC microprocessor 220 executes at start-up. External memory 150 includes an SRAM 152 and an EPROM 158. EPROM 158 contains data and software which the boot routine loads into SRAM 152. SRAM 152 contains program, data, and stack memory for RISC processor 220 and also provides memory for delay equalization FIFOs as described below. Internal SRAM 222 is for frequently used data which can be accessed by RISC processor 220 simultaneously with the loading of an instruction from memory 150 into RISC processor 220.

VCP registers 226 control operation of the hardware input, output, and processing resources and are distributed in video processor 280 and various hardware resources coupled to data buses 204 and 294. Portal circuit 250 and a Huffman codec 260 from a data path for data transfers between data bus 204 and data bus 294 which is used by video processor 280.

Video processor 280 compresses or decompresses video data by executing software stored in on-chip RAM 282 and ROM 284. RISC processor 220 loads the software for video processor 280, from a host device or EPROM 158, into RAM 282 via portal circuit 250 and a DMA controller 296. An external memory 140 provides a frame buffer for data being compressed or decompressed. In one embodiment of the invention, memory 140 is a 2 Mbyte DRAM.

When VCP 110 acts as an encoder, DMA controller 296 transfers of uncompressed video data from video input interface 211 or portal circuit 250 to memory 140 via data bus 294 and a DRAM interface 292. After video processor 280 compresses video data using a protocol implemented in software, DMA controller 296 transfers the compressed data from memory 140 to portal circuit 250 from which a DMA controller 206 or RISC processor 220 retrieves the compressed video data for weaving with audio data or otherwise for forming an output compressed bit stream.

When VCP 110 acts as a decoder, an I/O resource, such as host interface 214 or TDM interface 215, receives a bit stream containing compressed data. RISC processor 220 and processing resources such as H.221/BCH decoder separate audio data from video data. RISC processor 220 and/or external DSP 160 process audio data. DMA controller 206 transfers compressed video data to portal circuit 250, and DMA controller 296 transfers the compressed video data from portal circuit 250 to memory 140. Video processor 280 decompresses video data using the selected protocol and stores the decompressed video data back in memory 140. DMA controller 296 transfers the decompressed data from memory 140 to video output interface 212 for display by monitor 135.

RISC processor 220 and video processor 280 operate in parallel and have separate data paths, data bus 294 and data bus 204, which are interconnected by portal circuit 250 and Huffman codec 260. RISC processor 220 supervises operation of VCP 110 including DMA controllers 206 and 296 which are associated with data buses 204 and 294.

Data bus 204 provides RISC processor 220 with a full 32-bit interface to internal memories 222 and 224, external memory 150, and VCP registers in resources coupled to data bus 204. Memory 150 contains program, stack, and data storage for RISC processor 220 (and buffer storage for input and output data, bit stream framing, and video rate buffering as described below). An instruction data bus 208 allows RISC processor 220 to fetch an instruction from memory 150 simultaneously with an access to an internal resource coupled to data bus 204. In particular, SRAM 222 stores data which RISC processor 220 uses commonly, and access to SRAM 222 is overlapped with the next instruction fetch to increase the number of instruction per second. ROM 220 is connected to data bus 204 and instruction data bus 208 and contains code and data which RISC processor 220 executes at start-up.

In one embodiment of the invention, RISC processor 220 is a microprocessor which implements an enhanced MIPS-X instruction set. The MIPS-X instruction set is described in "MIPS-X INSTRUCTION SET and PROGRAMMER'S MANUAL", Technical Report No. 86-289, by Paul Chow, which is incorporated by reference herein in its entirety. In this embodiment, RISC processor 220 has 32-bit program instructions and 32-bit pipelined data. Memory interface 202 has an isolation circuit connected to instruction data bus 208 and data bus 204. When RISC processor 220 executes an instruction that accesses data in internal memory 222, the isolation circuit disconnects memory 150 from data bus 202 so that RISC processor 220 fetches the next instruction from memory 150 via instruction data bus 208 simultaneously with the access to internal memory 222. To improve the efficiency of 8-bit and 16-bit operations, MIPS-X instruction set can be augmented to include the instructions disclosed in Appendix A. RISC processor 220 is programmable using 'C' language compilers which are available for MIPS-X processors. In particular, the "VCP/RISCitt Developer's Toolkit" which is available from Integrated Information Technology, Inc. of Santa Clara, Calif. provides a 'C' compiler which employs the augmented instructions set of Appendix A.

Figure 3:
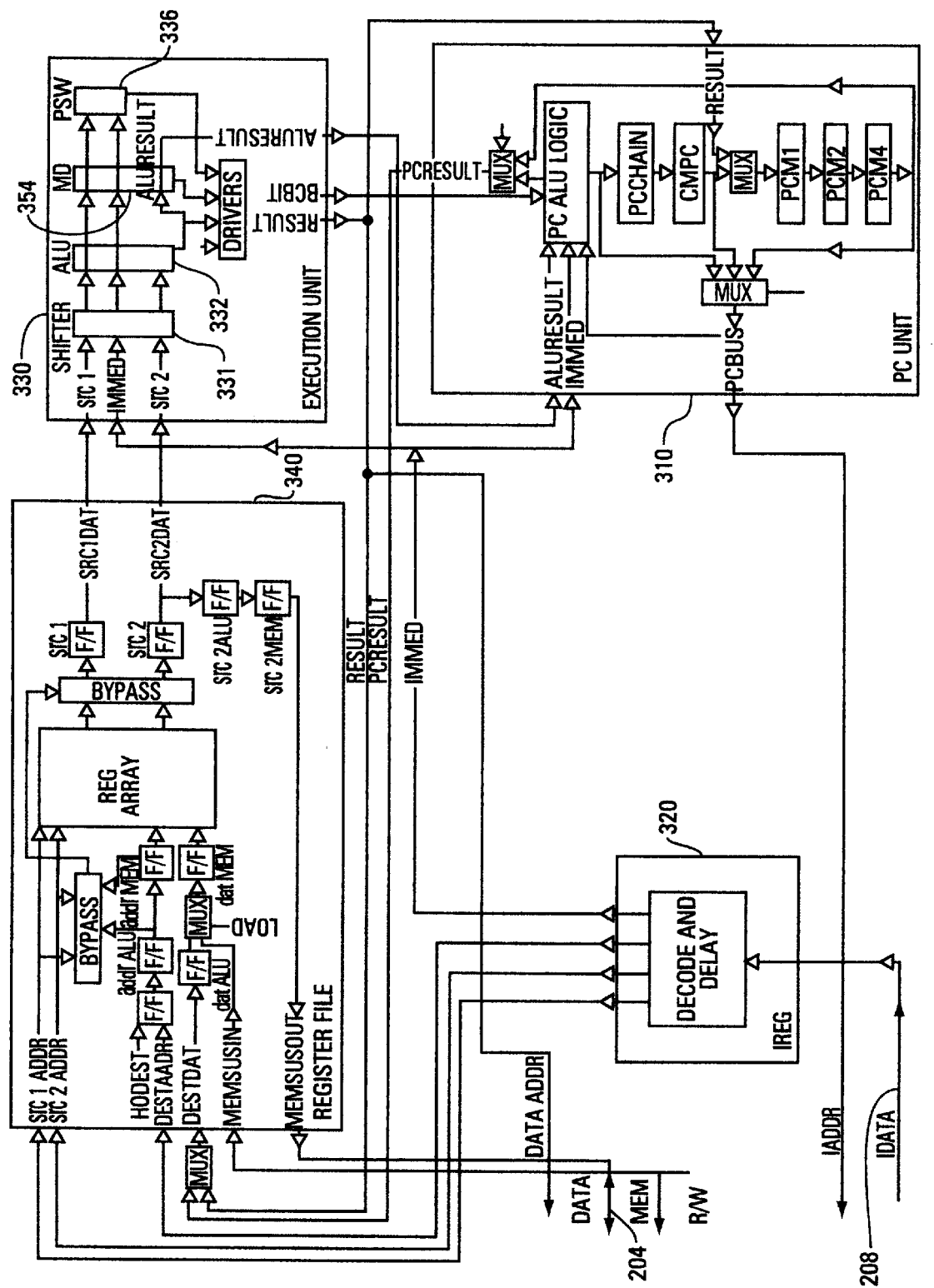
FIG. 3 is a block diagram of a RISC processor used in the video communications processor of FIG. 2.

FIG. 3 shows a block diagram of an embodiment of RISC processor 220 which implements the MIPS-X instruction set. "The MIPS-X Microprocessor", edited by Paul Chow, published (1989) by Kluwer Academic Publishers provides additional description of the architecture of such processors. RISC processor 220 contains a program count unit 310, an instruction decode unit 320, an execution unit 330, and a register file 340. Program count unit 310 generates a 30-bit instruction address signal IADDR identifying the location of a 32-bit program instruction which is loaded into an instruction register in instruction decode unit 320. Instructions such as the load and store instructions have fields indicating source registers and destination registers in register file 340. Instruction decode unit 320 generates 5-bit signals SCRC1ADDR, SCRC2ADDR, and DESTADDR which select registers in register file 340. A signal IMMED indicates immediate data from the decoded instruction. Program count unit 310 increments signal IADDR to the next data instruction or, in the case of a branch instruction, changes signal IADDR according to a signal IMMED if a branch condition is met.

Execution unit 330 contains a shifter 331, an arithmetic logic unit 332, a multiplier/divider 334, and a processor status word 336. Execution unit 330 generates a signal RESULT from data signals SRC1DAT and SRC2DAT from register file 340 and signal IMMED from instruction decoder 320. Signal RESULT is stored in register file 340 or asserted as an address signal DATA_ADDR for load and store instructions.

Figure 15:
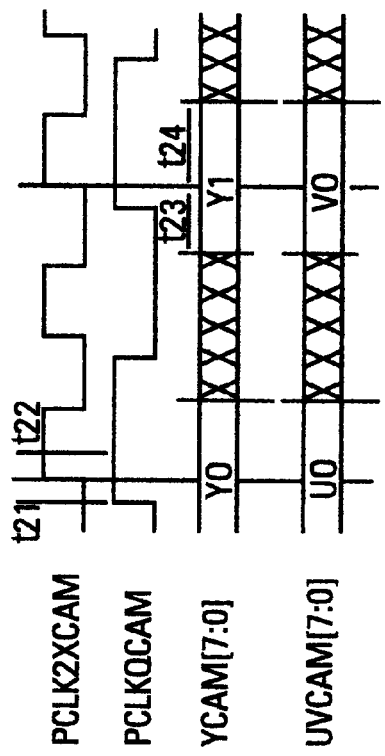
FIGS. 15 and 16 are timing diagrams of input and output operations for pixel data using a single clock signal.
Figure 16:
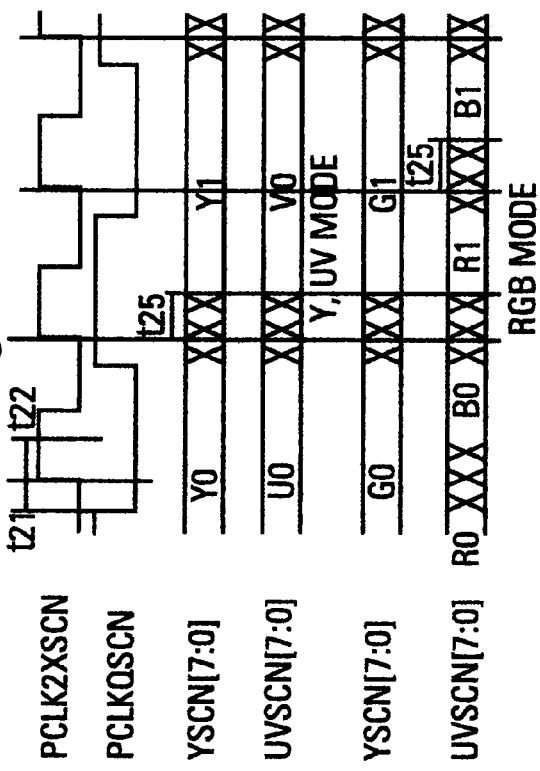

Memory interface 202 (FIG. 2) controls accesses to mapped I/O devices such as standard SRAM or non-volatile memory (ROM, EPROM, EEPROM, and flash). A data 32-bit data bus LD[31:0] and a 20-bit address bus LA,[19:0] connects memory interface 202 with external memory 150, but memory interface 202 also supports 16-bit and 8-bit devices. Signals on four byte enable lines, LWRLL, LWRUI, LWRHL, and LWRHH, determine which bytes in a 32-bit word are written to memory 150. Memory interface 202 supports four independent external address spaces for four banks of memory or mapped I/O devices. Four chip enable lines LCE[3:0] from memory interface 202 select the address space being accessed. Each address space has programmable bus width and wait-states. Memory interface 202 and RISC processor 220 thus can support varied types of memories including SRAM, ROM, EPROM, EEPROM, and flash and memory mapped I/O devices. The timings of read and write operations for an exemplary embodiment of memory interface 202 are shown in FIGS. 15 and 16 and described in Appendix B.

In stand-alone applications, RISC processor 220 acts as the primary or only microcontroller and supervises the devices connected to memory interface 202. In one application of VCP 110, memory interface 202 connects to an SRAM, an EPROM, and an infrared sensor for a remote control device. RISC processor 220 executes software for coding and decoding of audio and video signals and software which polls registers in the infrared sensor to determine when to begin or stop encoding or decoding operations.

Figure 4:
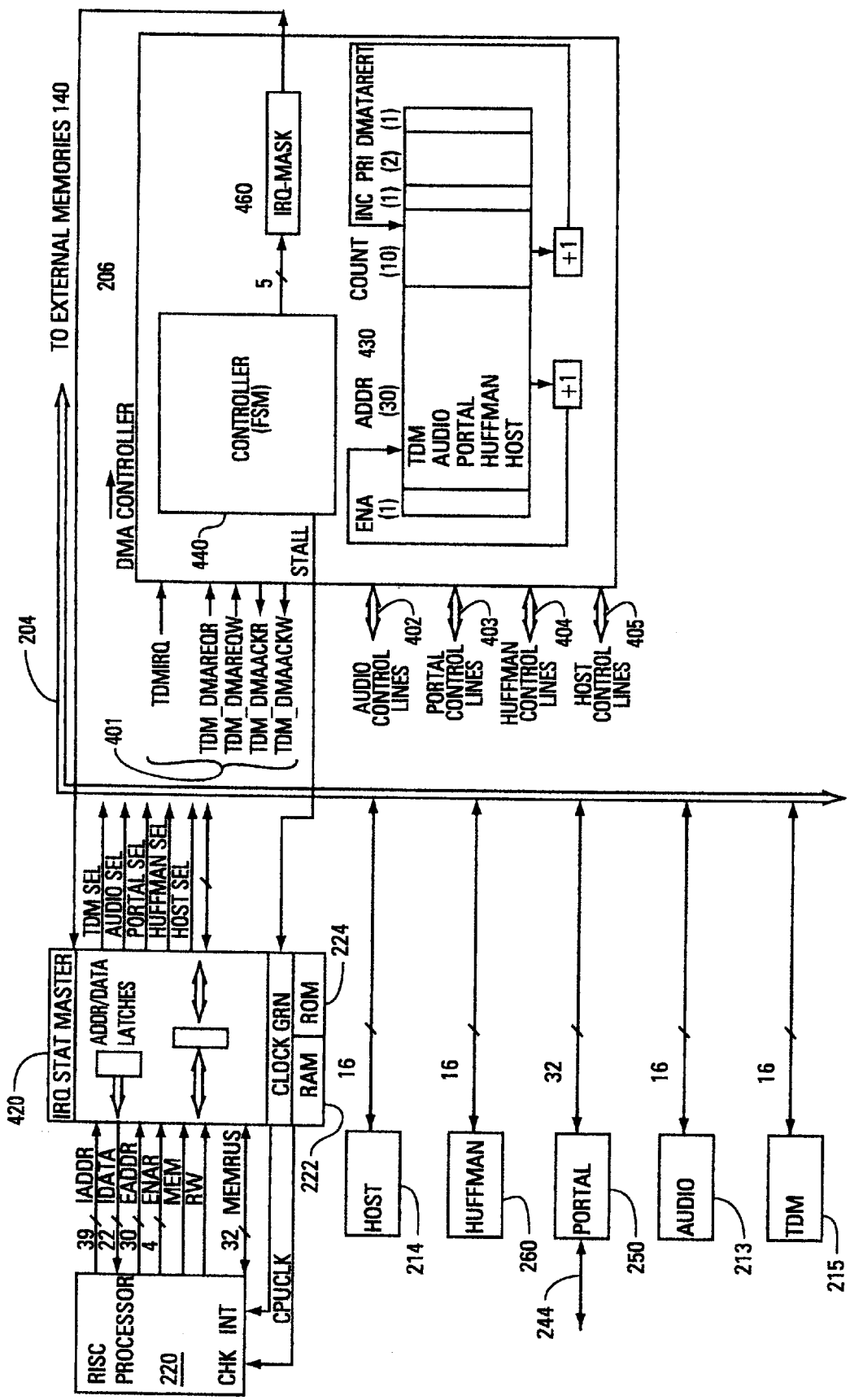
FIG. 4 is a block diagram of hardware coupled to a data bus used by a RISC processor in the video communications processor of FIG. 2.

FIG. 4 shows a block diagram of DMA controller 206, resources 213, 214, 215, 250, and 260, RISC processor 220, and a RISC interface circuit 420. RISC interface 420 includes internal RAM 222 and ROM 224, a clock generator 428, and an interrupt master. Clock generator 428 generates a clock signal for RISC processor 220 and for access to external memory 150. RISC interface 420 also generates a signal AUDIO_SEL, TDM_SEL, HOST_SEL, PORTAL_SEL, or HUFFMAN_SEL when RISC processor 220 asserts an address signal EADDR of a VCP register in resource 213, 214, 215, 250, or 260.

DMA controller 206 is a ten channel DMA controller which moves data via memory interface 202, between external memory 150 and hardware resources including: audio interface 213; host interface 214; TDM interface 215; portal circuit 250; and Huffman codec 260. Each resource 213, 214, 215, 250, and 260 has two channels, one for reading from and the other for writing to memory 150. Five sets of control lines 401, 402, 403, 404, and 405 connected resources 215, 213, 250, 260, and 214, respectively, to DMA controller 206. When one or more of hardware resources 213, 214, 215, 250, or 260 requires to access to memory 150, the resources requiring access assert control signals on control lines 401 to 405. For example, when TDM interface 215 receives data from external source such as a CD-ROM drive or an ISDN line, TDM interface 215 asserts to DMA controller 206 a signal TDM_DMAREQR to indicate TDM interface contains data to be read. TDM interface 215 indicates availability for a write by asserting a signal TDM_DMAREQW. When a DMA channel is ready for the write or read, DMA controller 206 asserts a signal TDM_DMACKW or TDM_DMAACKR. TDM interface 215 asserts a signal TDMIRQ to request an interrupt of RISC processor 220 for direct communications between TDM interface 215 and RISC processor 220. Similar control signals are used for communication with resources 213, 214, 250, and 260.

Each DMA channel has an enable bit, a pointer field (a 30-bit address), a count field, a priority field, and a completed bit in a register set 430 in DMA controller 206. RISC processor 220 writes to register set 430 to control the DMA channels. RISC processor 220 initiates a DMA transfer of data to a particular resource by: preparing a buffer in external memory 150, for example by writing data to the buffer if the data is to be transferred to the resource; writing the address of the buffer to the pointer field corresponding to the desired channel; writing a count indicating the size of the buffer, to the count field of the channel; and then setting the enable field of the channel.

Each channel has a priority. In one embodiment of the invention, TDM interface 215 and audio interface 213 have highest priorities because devices connected to these interfaces typically require specific timing for data transfers. Portal circuit 250 and Huffman codec 260 have intermediate priorities because data transfers these resources are for internal operations which have flexible timing requirements lost interface 214 has lowest priority because typically host devices coupled to host interface 214 can be stalled if data is not ready when requested. RISC processor 220 changes the priority of each channel by setting an appropriate priority field in registers 430.

A control unit 440 in DMA controller 206 is a state machine which controls the ten channels. During a DMA transfer, control unit 440 selects the enabled and ready channel which has the highest priority and asserts a signal STALL to prevent RISC processor 220 from using data bus 204 during the next clock cycle. Control unit 440 is limited to asserting signal STALL at most every other clock cycle so that RISC processor 220 operates at least 50% of clock speed. While RISC processor 220 is stalled, one word of data is transferred on data bus 204 between a storage location in memory 150, indicated by the pointer field for the channel, and the selected resource. The size of the word transferred depends on the selected channel. Channels for resources 213, 214, 215, and 260 have 16-bit words. Portal circuit 250 has 32-bit words.

After a word is transferred, signal STALL is deasserted, and values in the pointer and count fields are incremented or decremented. When the count field reaches a cut-off value (for example if the count is decremented to zero), control unit 440 asserts an interrupt signal to indicate that a DMA transfer requested by RISC processor 220 is complete. RISC processor 220 writes to a register 460 to mask interrupts.

External memory 150 acts as FIFO storage for the numerous buffering operations and eliminates on-chip FIFOs. In some applications, external FIFO buffers between VCP and external devices are not needed because RISC processor 220 is programmed to create FIFO buffers in memory 150. In many systems, TDM interface 215 connects to an ISDN chipset and audio port 213 connects to audio DACs or to a DSP for audio processing. Software executed by RISC processor 220 can reserve memory space in memory 150 for data transfers to or from TDM and audio interfaces 213 and 215 so that additional external buffers are not required.

Three input/output hardware resources coupled to data bus 204 include audio interface 213, host interface 214, and TDM interface 215. Circuits for implementing input/output interfaces 213, 214, and 215 are known in the art. According, the description concentrates on the function of interfaces 213, 214, and 215.

TDM interface 215 implements a high-speed, bidirectional serial bus which is intended to transfer the encoded bit stream to a network interface. TDM interface 215 implements a number of high-speed serial protocols including concentration highway interface (CHI), GCI, K2, SLD, MVIP and IOM2 formats. TDM interface port 215 can also act as a general purpose 16 Mbit/sec serial link when not constrained by the TDM protocols.

Host interface 214 provides a general purpose parallel interface to VCP 110. The host device can use host interface 214 to control VCP 110 and to transfer user, audio, and bit stream information. In the exemplary embodiment, host interface 214 accesses six registers that are described in Appendix B. Signals HA[2:0] (FIG. 2) are asserted by the host device to select a three registers as source or destination of data signals HD[15:0]. Host interface 214 uses lines HRDREQ# and HWRREQ# to indicate readiness to send and receive data. VCP 110 uses a line HIRQ to indicate that the host should read a register HOSTIRQSTAT containing interrupt information. Software executed by RISC processor 220 can generate interrupts to the host for any desire reason, but the host masks interrupts by writing to a register HOSTMASK in host interface 214.

Host interface 214 contains three ports, a DMA port, a VCXI port, and a Debug port. The DMA port typically transfers user data to be multiplexed with the audio and video data in an H.221 compliant encoded bit stream. This mechanism allows applications such as file transfer and shared screens during a video conference. In addition, DMA port can carry the audio and multiplexed bit stream.

The VCXI port transfers commands and status information between VCP 110 and the host device. In some systems, VCP 110 acts as the system controller and so there is no host device. In other systems, an external microprocessor, not RISC processor 220, is responsible for controlling the system. The external microprocessor controls VCP 110 through the VCXI port. One control technique is a "shared variable" mechanism which is implemented in software to give the host device read/write access to control variables in the program executed by RISC processor 220.

The debug port provides an additional path to the VCP RISC processor 220 for debugging purposes. This allows software debuggers access to the state of the VCP hardware and software without the disturbing the VCXI or DMA ports.

Audio interface 213 provides a bidirectional serial port for connection to a DSP serial port for transfer of compressed audio data when audio compression is handled outside VCP 110. For decoding, VCP 110 separates audio data from a bit stream containing video and audio data and passes the audio data to DSP 160 for decompression. For encoding, DSP 160 transfers the compressed audio data to VCP 110 which multiplexes the compressed audio data with video and user data from video processor 280 and host interface 214.

Depending on the application, audio interface 213 connects directly to a DSP or to an audio ADC and DAC or codec, in which case software executed by RISC processor 220 is responsible for any audio compression. Some video conferencing applications require multiple DSPs for audio compression and echo cancellation. The DSPs can communicate either through shared memory or by daisy-chaining serial ports. For daisy-chaining, two serial ports are required on the DSP next to the VCP.

Hardware processing resources attached to data bus 204 aid in the tasks performed by RISC processor 220. For example, compressed bit streams often include data structures that are not byte aligned. Conventional processors, such as RISC processor 220, load and store data aligned at byte boundaries and are less efficient at processing values which may straddle byte boundaries. Huffman codec 260 and H.261 compliant H.221/BCH bit stream parser/multiplexer 240 help RISC processor 220 process data structures which are not byte aligned.

Figure 5:
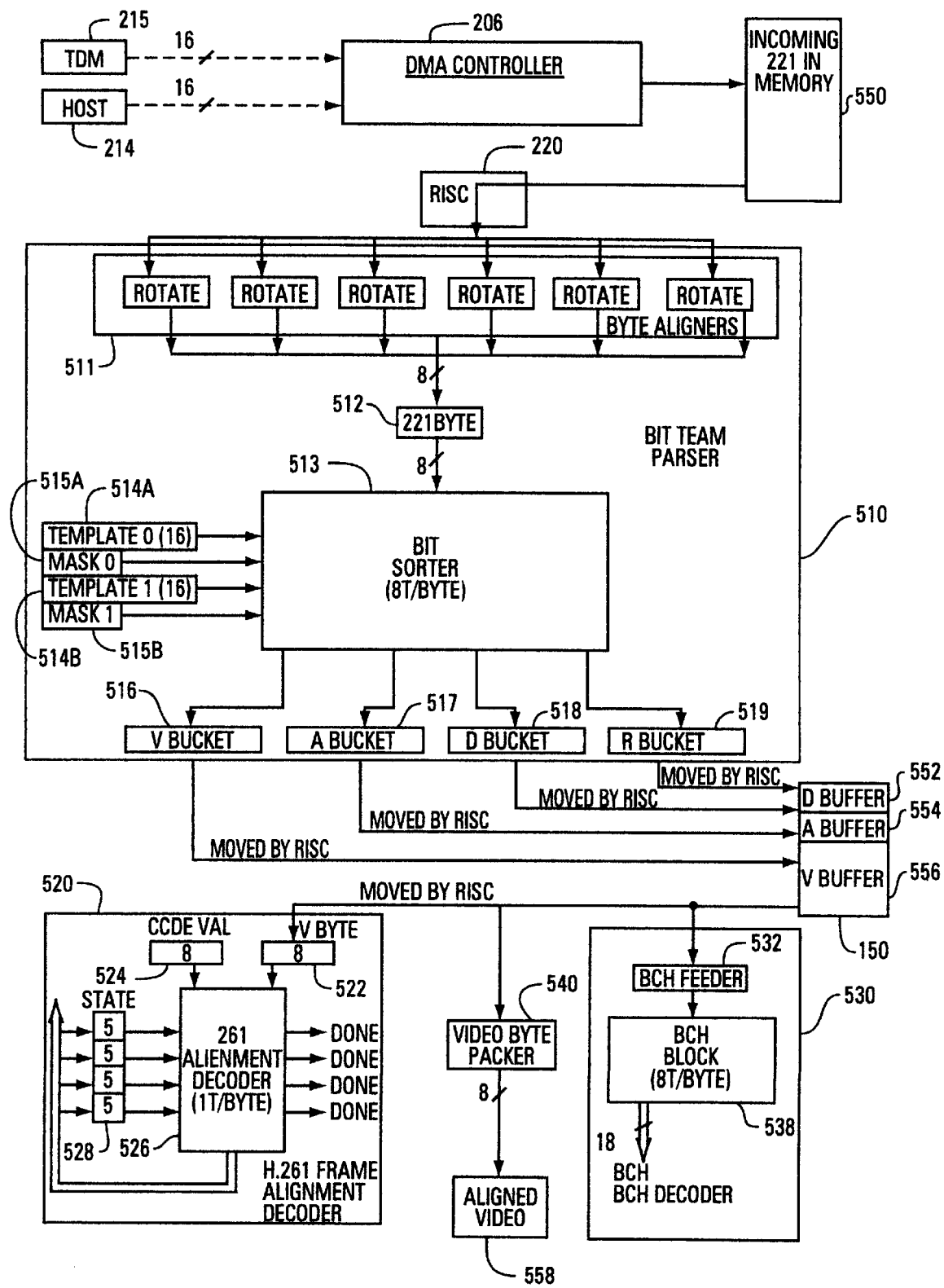
FIG. 5 is a data flow diagram illustrating the operation of a bit stream parser, an alignment decoder, and an error correction circuit.
Figure 6:
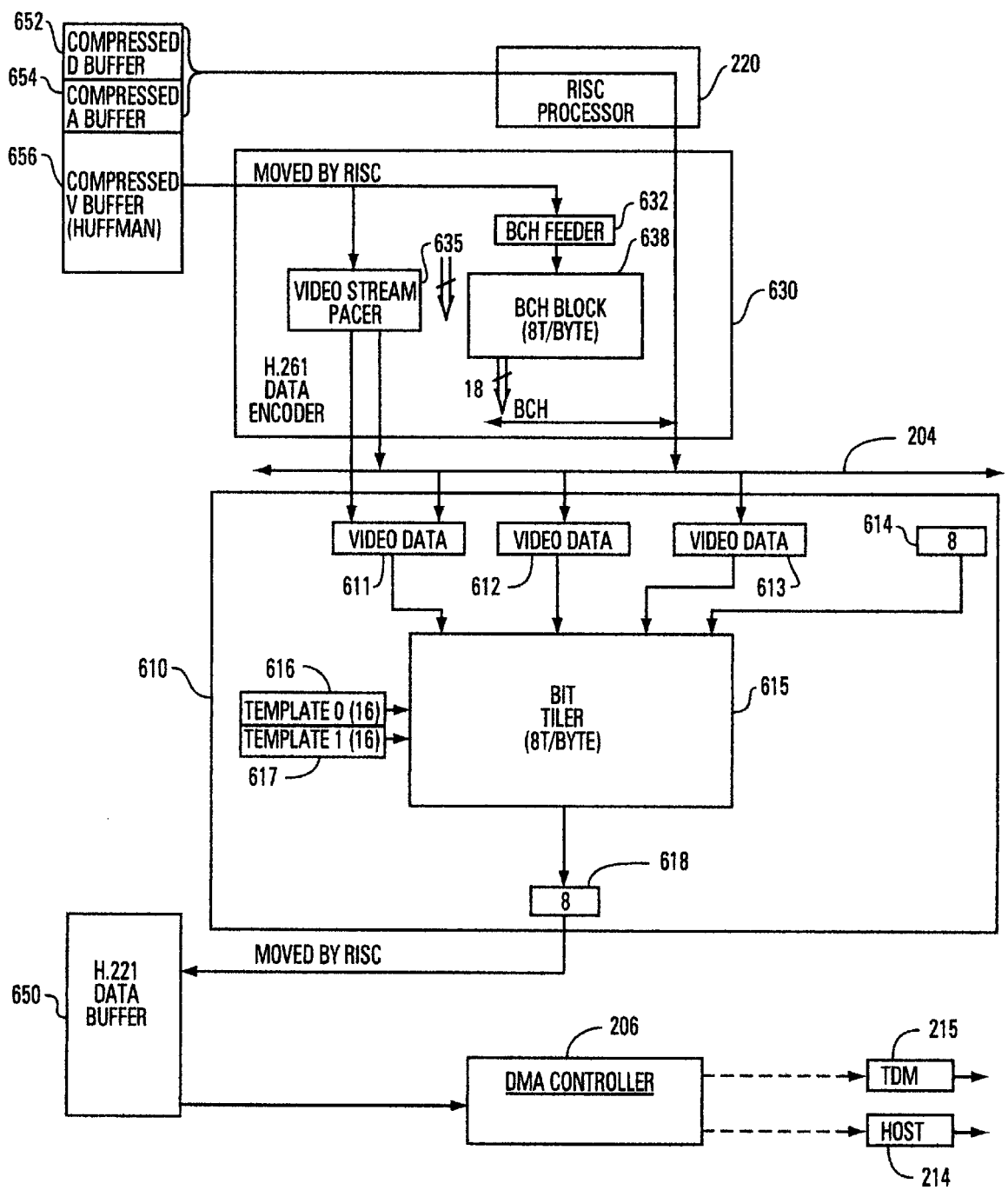
FIG. 6 is a data flow diagram indicating the operation of an ECC generator and a bit stream encoder.

FIGS. 5 and 6 show a data flow diagrams for hardware resource 240 which includes a bit stream parser 510 and a bit stream multiplexer 610, respectively. In an embodiment of the invention where a bit stream format includes several types of data, RISC processor 220 can employ hardware resource 240 to parse or form a bit stream. For incoming data, DMA controller 206 stores data from the bit stream received through host interface 214 or TDM interface 215 to VCP 110 into an input buffer 550 created in memory 150. The bit stream may be in one or several separate data transmission channels according to H.221. In particular, H.221 defines a standard for transmitting a bit stream over several ISDN channels. RISC processor 220 identifies the transmission channel corresponding to each byte of data in input buffer 550 and periodically moves a byte of data from input buffer 550 to a corresponding shift register in a byte aligner 511. Byte aligner 511 contains six shift registers corresponding up to six transmission channels.

Registers 514A and 514B contain templates which indicate formats of bytes in the bit stream. In one embodiment of the invention, each bit in the bit stream corresponds to two bits in a template, and the two bits indicate whether the corresponding bit from the bit stream is video, audio, format, or user data. Two bits equal to 00b, 01b, 10b, or 11b respectively indicate a corresponding bit in the bit steam is video data, audio data, format data, or user data for RISC processor 220. RISC processor 220 changes templates 514A and 514B according to the protocol being employed in the bit stream. Bit stream parser 510 is particularly suited for H.221 but can also be applied in decoding bit streams according to other protocols.

Each shift register in byte aligner 511 contains at least 16-bits from the bits stream. Byte aligner 511 selects a shift register containing the next byte from the bit stream and generates a byte 512 which is aligned with template 514A or 514B corresponding to the byte. A bit sorter 513 parses aligned byte 512 according to the template 514A or 514B and a mask 515A or 515B by storing video bits, audio bits, format bits, and user data bits respectively in registers 516, 517, 518, and 519. Mask registers 515A and 515B indicate bits which are dropped instead of being stored in one of registers 516 to 519. RISC processor 220 periodically moves video, audio, and format data in registers 516 to 518 to buffers 552, 554, and 556 in memory 150. RISC processor 220 processes user data from register 519 according to user defined software.

Other processing resources for decoding include an H.261 frame alignment decoder 520, a BCH error detector 530, and a byte packer 540. RISC processor 220 moves video data from video buffer 566 into alignment decoder 520, BCH error detector 530, or video packer 540 if the functions of the resource is required for decoding according to the software selected protocol.

Alignment decoder 520 determines the locations of frames of video data by finding alignment code words in accordance with the H.261 protocol. In the H.261 protocol, one bit every 512 bytes is a part of a 24-bit alignment code pattern. If VCP 110 is decoding H.261 video, RISC processor 220 sequentially moves bytes from video buffer 556 to a register 522 in alignment decoder 520. Alignment decoder 520 finds a 24-bit alignment code by searching through 24 sets of 512 bytes. Each set of 512 bytes is searched for a different bit from the codeword. A register 524 contains an 8-bit pattern that is repeated three times to form the alignment code.

For each byte loaded into register 522, a state machine 526 compares each bit in the byte to the current alignment code bit and changes state counts depending on which bits of the byte in register 522 match the code bit. Each byte of video has eight state counts, one for each bit, and a buffer in memory 150 contains 4096 (512×8) state 5-bit counts. A set of counters 528 contains 5-bit state counts which are read from, changed, then written to the buffer. If a bit from register 522 matches the code bit, a state count corresponding to the bit is incremented. If the bits do not match, the corresponding state count is reset to zero. After 512 bytes of video have been transferred to alignment decoder 520, the next set of 512 bytes of video data are searched for the next code bit from the alignment code, and state counts are incremented or reset according to whether corresponding bits are equal to or different from the current code bit.

If after 24 sets of 512 bytes have been search, one of the state counts is equal to 24, the bit in the first set of 512 byte which corresponds to that state count indicates the start of a frame of video data. If none of the state counts is equal to 24, the search is repeated starting either with a different set of 512 bytes of video data or with a different initial code bit.

A frame (or other group) of video data can begin at any bit within a byte in video buffer 556. Video packer 540 packs a frame of video data into a buffer 558 for byte aligned video data. Typically, data from buffer 558 is fed through a DMA to Huffman codec 260 for Huffman decoding. RISC processor 220 moves bytes of non-aligned video data from video buffer 556 one of eight input registers in video packer 540. Each register corresponds to a different number of valid least significant bits which are to be packed into bytes and transferred to buffer 558. For example, if a frame starts with the least significant bit of a byte in buffer 556, that RISC processor 220 moves that byte to a register corresponding to one significant bit, and only the one significant bit is moved into an output register of video packer 540.

BCH error detector 530, contains a BEC block 538 which calculates a BCH error correction code (ECC) defined by H.261 and compares the calculated ECC to an ECC from the video data. If the two ECCs are not equal, the video data contains errors, and BCH error detector 530 provides a code to RISC processor 220 so that RISC processor 220 can attempt to correct the error. To calculate or locate ECCs, BCH error detector 530 requires video data that is aligned with the alignment code. RISC processor 220 writes video bytes from video buffer 556 to one of eight registers 532 where the address of the register indicates the number of bits in the aligned stream. Error detection and byte packing can be conducted in parallel so that a single set of eight registers serves both video packer 540 and BCH error detector 530.

FIG. 6 shows a data flow diagram of resources 630 and 610 which assist RISC software in aligning, multiplexing and formatting audio, video, and user data for generation of a compressed bit stream. User data, compressed audio data, and compressed video data are stored in buffers 652, 654, and 656 respectively in memory 150. Video processor 280 compress video data for buffer 656. An external DSP and/or RISC processor 220 compress audio for buffer 654, and RISC processor 220 creates the user data in buffer 652.

Software controls data flow to resource 610 and 630. The H.242, H.230 and H.243 specifications are also supported using RISC software. Resource 610 is a bit slice engine which combines data from registers 611, 612, and 613 into a register 618 in accordance with a template 616 or 617. Resource 630 is a BCH ECC generator which packs video data and generates an ECC which are compliant with H.261. RISC processor 220 feeds a byte of compressed video data in to a set of eight registers 632 which have addresses indicating the number of bits in the byte which BCH block 638 uses in calculating a BCH error correction code. Video packer 635 packs video data and error correction codes into a video stream.

RISC processor 220 moves video data from the packed video stream, audio data from buffer 654, and user data from buffer 652 into registers 611, 612, and 613, loads templates into registers 616 and 617, and then starts in data multiplexer 610. A bit tiler 615 weaves bits from registers 611, 612, and 613 according to a template in register 616 or 617 to form, in register 618, a byte of the output bit stream. RISC processor 220 periodically moves the byte from register 618 to an output buffer 650 in memory 150, and DMA controller 206 moves the output bit stream through either host interface 214 or TDM interface 215.

Figure 7:
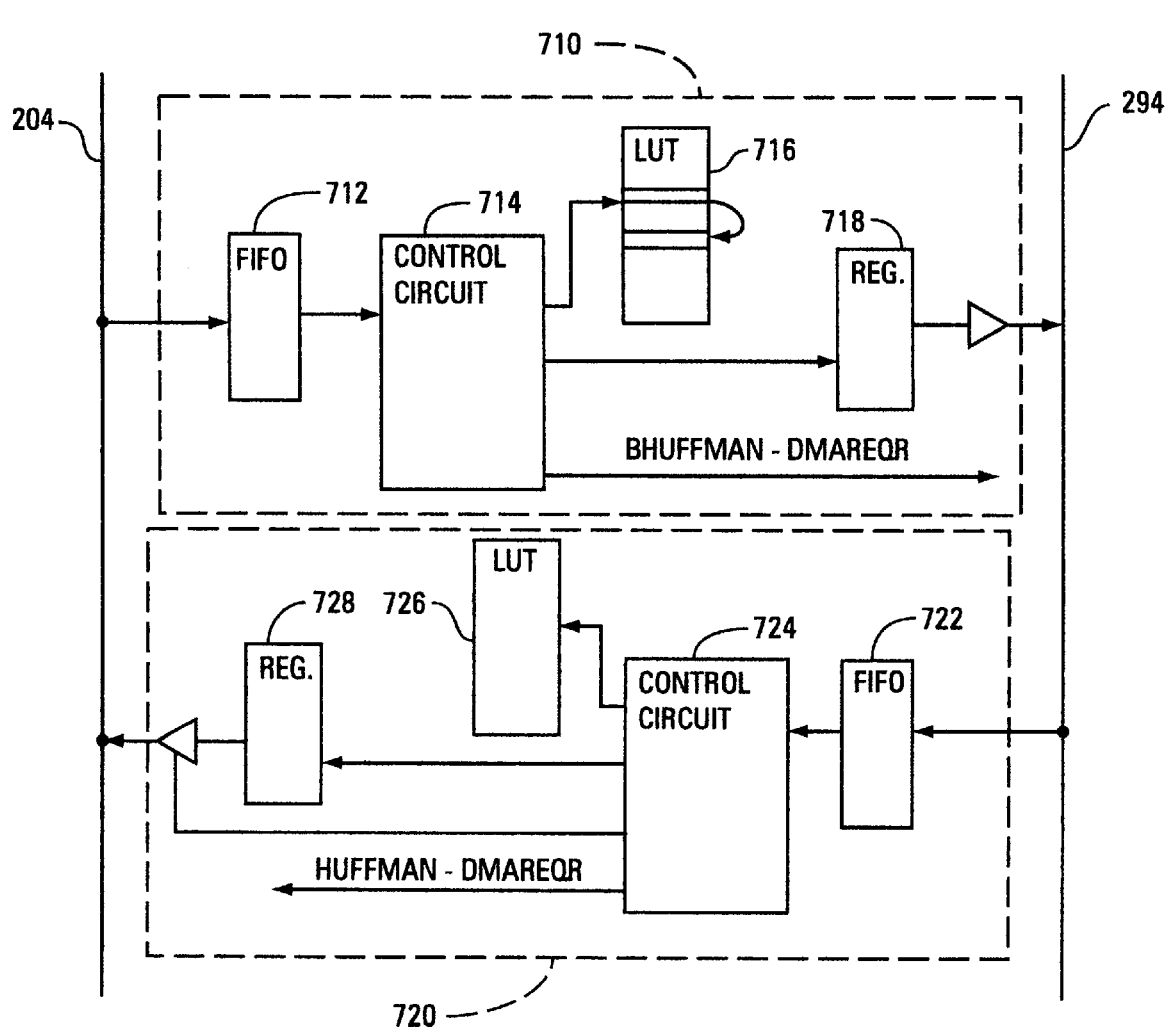
FIG. 7 is a block diagram of a Huffman codec.

Huffman codec 260 is a high-speed engine which performs variable length encoding or decoding using Huffman tables that are stored in Huffman codec 260. FIG. 7 shows an embodiment of Huffman codec 260 which contains look-up tables 716 and 726. Look-up tables 716 and 726 can be volatile memory which are easily changed and/or non-volatile memory for the look-up tables defined by the MPEG, JPEG, and H.261 standards.

A Huffman decoder section 710 includes a FIFO buffer 712 and a control circuit 714. During decoding, a DMA channel on data bus 204 transfers compressed video data to FIFO buffer 712. Control circuit 714 reads from LUT 716, a value which corresponds to a first set of bits (potential variable length code) from FIFO buffer 712. The value read either indicates a decoded value, typically a zero-run length/amplitude (RLA) token, or indicates that the set of bits is not a variable length code. If the set of bits is not a variable length code, control circuit 714 adds one or more additional bits to the set and reads a value, from look-up table 716, which corresponds to the new set of bits. Once a decoded-value is found, control circuit 714 writes the decoded value a register 718 which is coupled to bus 294, and asserts a signal BHUFFMBAN_DMAREQR to indicate that DMA controller 286 should be read from Huffman codec 260.

A FIFO buffer 772 in a Huffman encoding section receives a values or RLA tokens from data bus 294. A control circuit 724 reads the variable length code from a look-up table 726 and packs the variable length code into a register 728. When register 728 contains 16-bits of variable length codes, control circuit 724 asserts a signal HUFMAN_DMAREQR. DMA controller 206 transfers the Huffman encoded data to a video buffer in memory 150.

Resources in VCP 110 are organized so that most data transfers in VCP 110 are between resources coupled to the same bus 204 or 294. Huffman codec 260 is coupled to both data buses 204 and 294 for transfers of Huffman coded or decoded data. Additionally, portal circuit 250 provides a mechanism for transferring data transfer between buses 204 and 294. Portal circuit 250 forms a 32-bit bidirectional gateway between data bus 204 and data bus 294.

Figure 8:
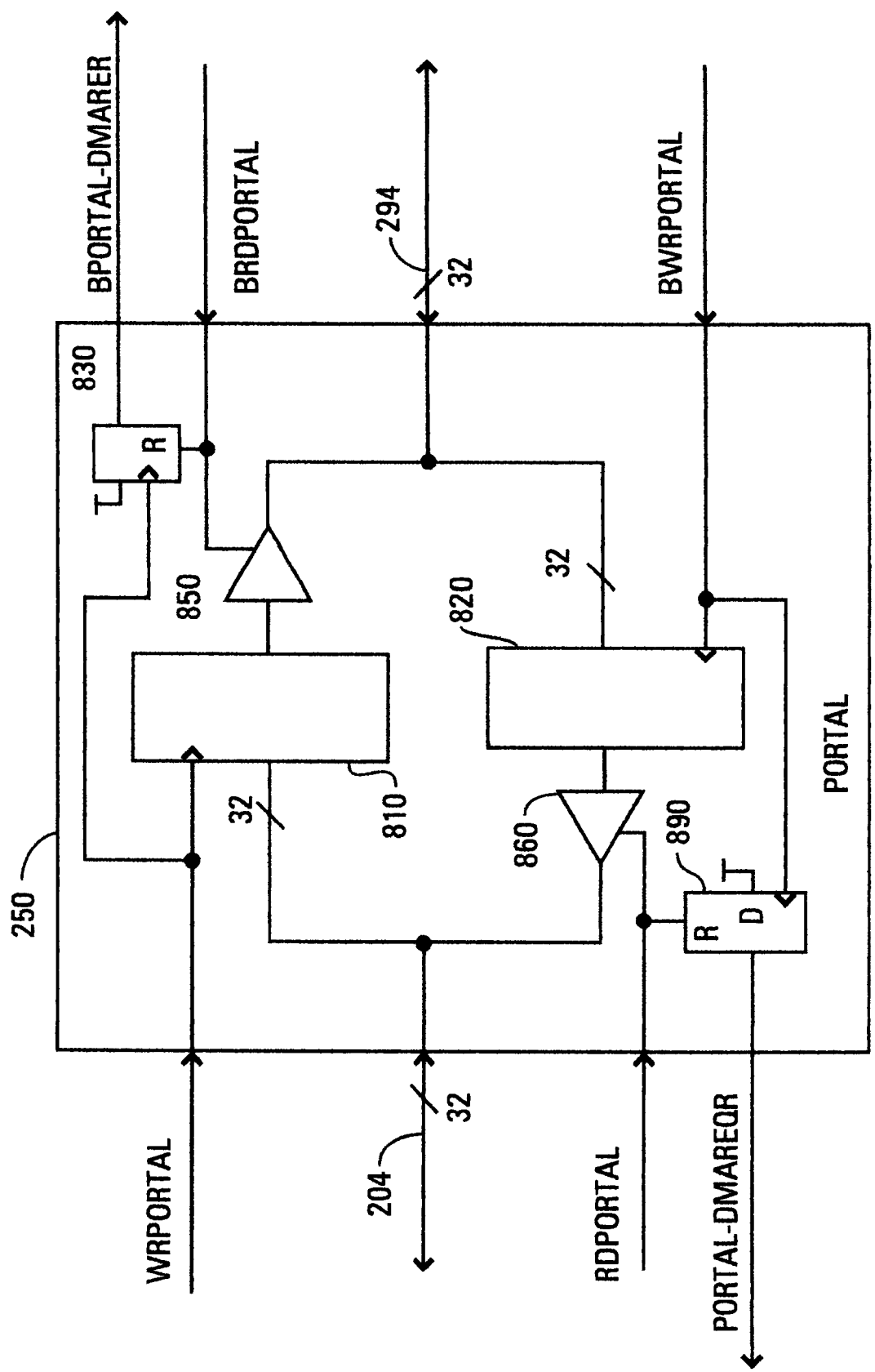
FIG. 8 is a schematic of a portal circuit for transferring data between data buses.

FIG. 8 shows a block diagram of portal circuit 250 in accordance with an embodiment of the invention. Portal circuit 250 includes a pair of 32-bit registers 810 and 820. Register 810 has an input port coupled to data bus 204. When DMA controller asserts a signal PORTAL_DMAACKW or RISC processor 220 generates an address signal corresponding to portal circuit 250, an address decode circuit (not shown) asserts a signal WRPORTAL, and register 810 latches a value from data bus 204. Signal WRPORTAL triggers a flip-flop 830 which asserts a signal BPORTAL_DMAREQR to indicate that portal circuit 250 contains data to be read. The data is read when DMA controller 296 or video processor 280 cause an address decode circuit to assert a signal BRDPORTAL. Signal BRDPORTAL resets flip-flop 830 and enables a tristate buffer 850 so that register 810 drives data bus 294. Data transfers from data bus 294 to data bus 204 through register 820, a flip-flop 840, and a tristate buffer 860. Returning to FIG. 2, DMA controller 296 has multiple channels which transfer 32-bit data via memory interface 292 between memory 140 and video input interface 211, video output interface 212, Huffman codec 260, portal circuit 250, and video processor 280. Each of video input and output interfaces 211 and 212, video processor 280, and Huffman codec 260 contains memory which allows DMA controller 296 to transfer data in DRAM page mode.

In the exemplary embodiment, memory interface 292 is a 32-bit wide interface that supports from 512 Kbytes to 8 Mbytes of external DRAM, implemented using ×1, ×4 or ×16 chips and is configurable for addressing DRAM chips up to 16 Mbit in size operating at a variety of DRAM speed grades. DMA controller 296 controls a DMA channel to DRAM refresh circuits in memory interface 292 which reads sections of DRAM to refresh those sections.

Video processor 280 is a programmable signal processor which implements video coding and decoding procedures such as motion estimatation, loop filters, discrete cosine transforms (DCTs), inverse DCTs, and quantization, inverse quantization, and zig-zag scanning as may be required by a software selected video protocol. In particular, video processor 280 can execute software which performs video compression and decompression operations required by the MPEG, JPEG and H.261 standards as well as proprietary video compression processes. One embodiment of video processor 280 implements the instruction set VP5 listed in "VP Programmer's Manual", by Hedley Rainnie (revised by Daniel Helman) which is available from Integrated Information Technology, Inc. and is incorporated by reference in its entirety.

Figure 9:
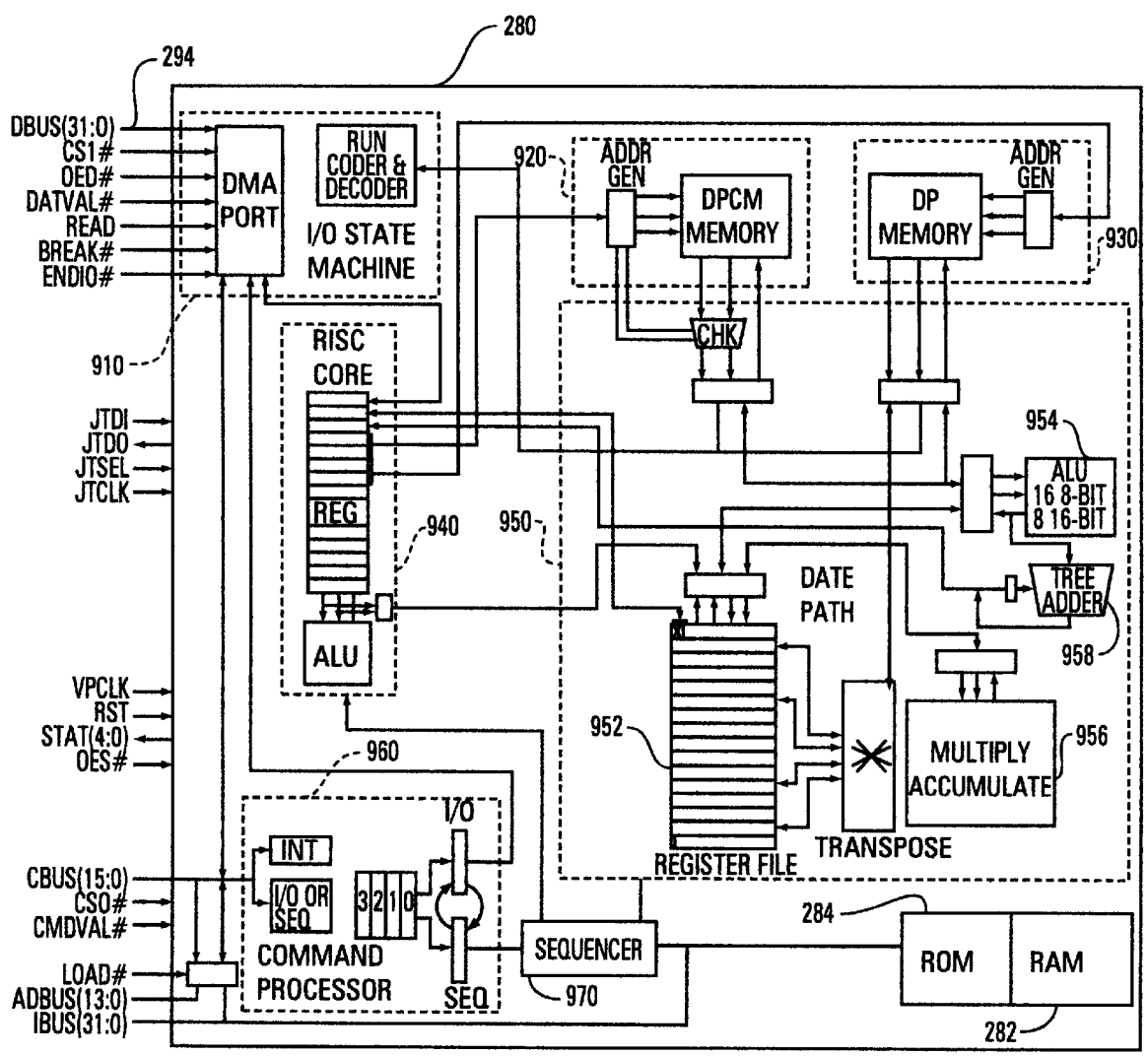
FIG. 9 is a block diagram of a video processor.

FIG. 9 shows a block diagram of an embodiment of video processor 280. Video processor 280 executes software which is stored in on-chip ROM 284 and RAM 282. On-chip ROM 284 is a 2 K×32 bit non-volatile memory containing subroutine commonly executed video processor 280.

On-chip SRAM 282 allows RISC processor 220 to download new subroutines for video processor 280. RISC processor 220 activates video processor 280 by writing to a command processor 960 which selects a subroutine from ROM 284 or RAM 282. Command processor 960 contains a que for a sequence of subroutines to be executed by video processor 280. A RISC core 940 and a sequencer 970 decode microcode instructions from the selected subroutine and control a data path 970 which implements the microcode instructions. RISC core 940 and data path 950 run until the subroutine is complete, then a next subroutine is performed.

Data path 950 contains an arithmetic logic unit 954, a tree adder, multiple multiply-accumulators 956, and a register file 952 which is divided into four banks of 64 16-bit registers. For some instructions, data path 950 processes all data in a bank of registers in register file 952. This facilitates video processing which commonly performs repetitive operations on blocks of data. An I/O state machine 910 controls input and output of data on data bus 294. Each memory read operation moves eight bytes (two 32-bit words) into video processor 280 and can occur simultaneously with computations by RISC core 940 and data path 950. Memories 920 and 930 provide storage for data before being moved into data path 950.

U.S. patent application Ser. No. 07/838,380, entitled "Programmable Architecture and Methods for Motion Estimation", by Jan Fandrianto et al.; and U.S. Pat. No. 5,379,351, entitled "Video Compression/Decompression Processing and Processors", issued Jan. 3, 1995, describe architectures for embodiments of video processor 280. Both U.S. patent application Ser. No. 07/838,380 and U.S. Pat. No. 5,379,351 are incorporated by reference herein in their entirety.

Video input interface 211 and video output interface 212 contain processing resources which filter and scale incoming and outgoing video data. Parallel operation of video processor 280 and video input and output interfaces 211 and 212 increases processing power and speed. At high VCP clock speeds, with data bus 294 in 32-bit mode to access two 256 k×16 DRAM chips, VCP 110 can decode CCIR601 resolution images at 60 frames per second. For less demanding applications such as MPEG1 SIF resolution decode or H.261 QCIF codec, data bus 294 can operate in a 16-bit mode and access a single 256 k×16 DRAM chip.

Video input interface 211 captures video frames which DMA controller 296 stores in memory 140. Video input interface 211 also provides hardware pre-processing functions usable in conjunction with software running on video processor 280. Video input interface 211 receives asynchronous digitized data from an outside video source such as a camera and a video ADC. Video data can be input in CCIR 601 YUV pixel format, or a seven-tap programmable filter in video input interface horizontally scales data to this resolution. In the embodiment describe below, the input video data is assumed to comply with the CCIR 4:2:2 data format for Y:U:V data, but other formats for video data could be employed.

Figure 10A:
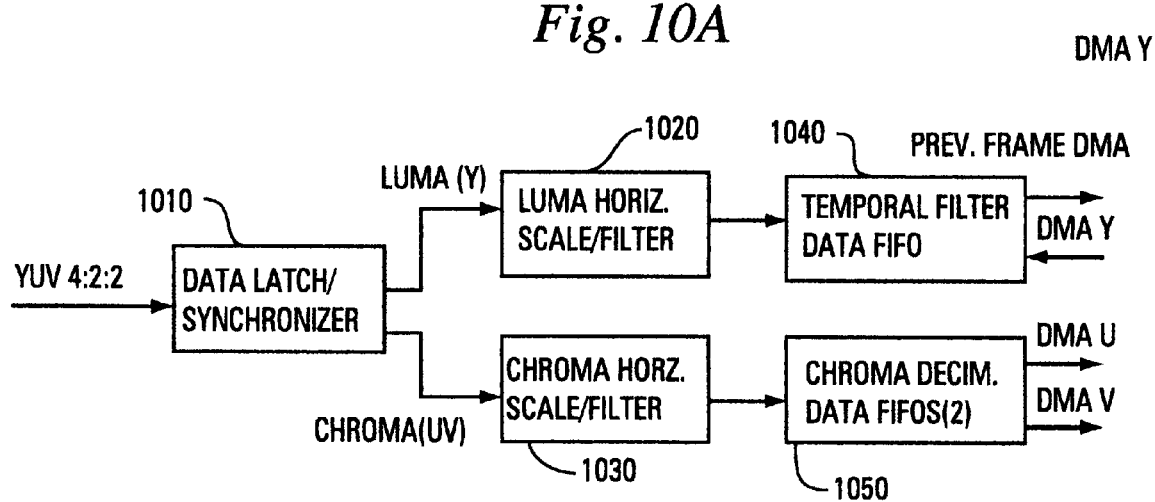
FIGS. 10A, 10B, 10C, and 10D show block diagrams of pre-processing resources in a video input interface.

Video input interface 211 processes lumina (or Y) data in parallel with chroma components U and V. FIG. 10A illustrates the data flow through video input interface 211. Video input interface 211 contains an input data latch 1010, horizontal scaling filters 1020 and 1030 for lumina and chroma data, a temporal filter for lumina data, and a two chroma decimators 1050. Input latch 1010 latches incoming data according to an external pixel clock signal PCLK2XCAM and synchronizes the data for processing according to an internal clock signal TCLK. The frequency of pixel clock signal PCLK2XCAM is less than one half the frequency of clock signal TCLK and if a 7-tap horizontal scaling filter is being used, is less than one quarter the frequency of signal TCLK. Signal TCLK is typically twice the frequency of signal CPUCLK. Synchronized data is transmitted to scaling filters 1020 and 1030.

Figure 10B:
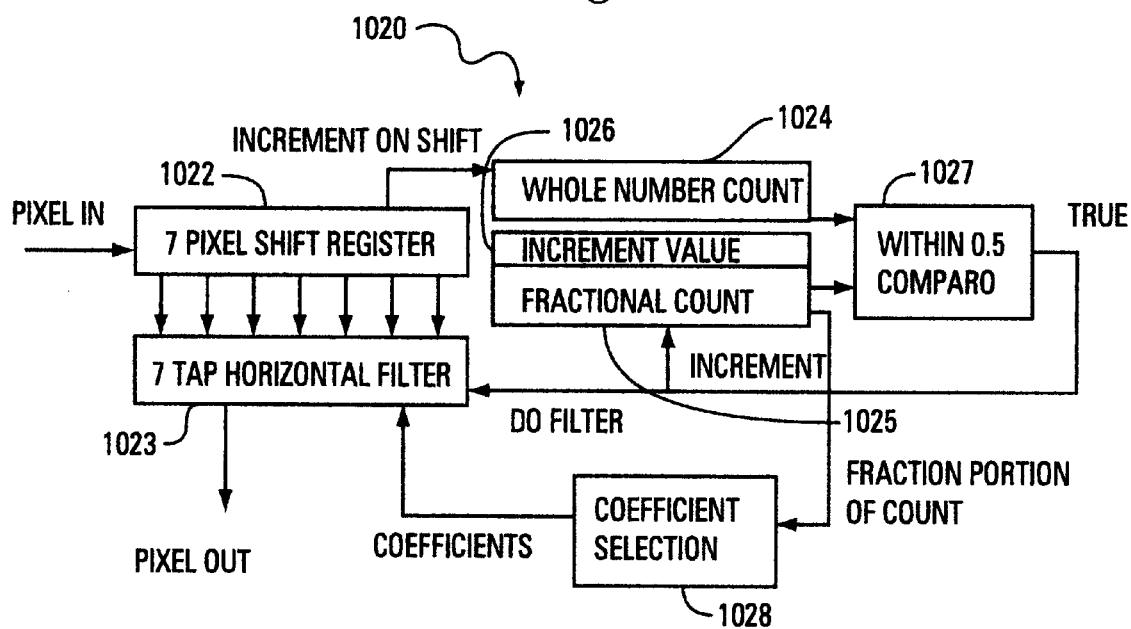

FIG. 10B shows a block diagram of a horizontal scaling filters 1020 which filters lumina data. Filter 1020 scales the input video data down horizontally by any factor, for example, the 640 pixels of 12.3 MHz sampled NTSC can be scaled to the 176 pixels of QCIF. Filter 1020 contains a shift register 1022 with the capacity to contain lumina values for seven pixels. The seven lumina values are the inputs of a 7-tap digital filter circuit 1023 which has programmable coefficients provided by a coefficient selection register 1028. To use filter 1020, RISC processor 220 initializes counters 1024 and 1025, writes an increment value for counter 1025 to an increment register 1026, and writes sets of filter coefficients to coefficient selection registers 1028. Counter 1024 contains a whole number count indicating a number of pixels input into filter 1020, and counter 1025 contains a count having a whole number part and a fractional part. In the exemplary embodiment, register 1026 is a 16-bit register, and the value in the register 1026 has a 4-bit whole part and a 12-bit fractional part which together indicate the ratio of the number of pixels in a line of a frame input to filter 1020 to the number of pixels in a line of a frame output from filter 1030. Counter 1025 periodically increments by the increment value in register 1026.

Typically, video interface 211 receives more pixel values than are intended to be captured, and shift register 1022 is initially filled with lumina values before processing of captured values begins. Alternatively, shift register 1022 is initially filled copies of the first captured pixel value. Captured values indicating lumina of pixels are input into shift register 1022, and counter 1024 increments by one for each pixel value. A comparator 1027 compares the whole number count in counter 1024 to the count in register 1025. If the counts in counters 1024 and 1025 are more than 0.5, a new pixel value is loaded into shift register 1022, and counter 1024 again increments by one. Pixels are loaded into shift register 1022 and counter 1024 increments until the counts in counters 1024 and 1025 are less than 0.5 apart. Counters 1024 and 1025 are typically initialized to zero, but counter 1024 can be initialized to 3 less than counter 1025 so that shift register 1022 contains some data before the counts in counters 1025 and 1024 are less than 0.5 apart.

When the counts in counters 1024 and 1025 are less than 0.5 apart, filter circuit 1023 generates an output pixel value from the seven pixel values in shift register 1022. Coefficients for filter circuit 1023 are selected according to the fractional part of the count in counter 1025. For example, in the exemplary embodiment, if the fractional part is in the interval [0, 0.1) or [0.9,1.0), [0.1,0.3), [0.3,0.5), [0.5,0.7), or [0.7,0.9), then the first, second, third, fourth, or fifth, respectively, set of coefficients in registers 1028 are selected. The output pixel value PO is $$PO=[A*P1+B*P2+C*P3+D*P4+E*P5+F*P6+G*P7]/N$$

where P1 to P7 are the pixel values in shift register 1022; A, B, C, D, E, F, and G are the selected set of filter coefficients; and N is a normalization factor which depends on the filter coefficients.

When an output pixel value is generated, counter 1025 increments by the amount of the increment value in register 1026. If the increment value is less than 1.0, output data has more pixel per line than does the input data, and another comparison 1027 is performed before another pixel value is loaded into shift register 1022. If the counts in counters 1024 and 1025 are still less than 0.5 apart, another set of filter coefficient is selected, and filter circuit 1023 generates another output pixel value. Otherwise, a new pixel value is loaded into shift register 1022, and the oldest pixel value is shifted out.

Limiting the increment value to greater than one limits the number of filter operations to fewer than one per input pixel, and provides predictable timing. In the exemplary embodiment of filter 1020, contains two multipliers which operate in parallel. Accordingly, a seven tap filter requires four clock cycles to perform the multiplications for one filter operation. Addition and then a division (or logical shift right) are pipelined with the multiplications. In order to avoid an input data overflow when one filter operation is performed per input pixel, clock signal TCLK for the multipliers is at least four times faster than pixel clock signal PCLK2XCAM. Filter 1020 is operable in a three tap mode that calculates an output pixel value $$PO=[A*P1+B*P2+C*P3]/N$$

in two clock cycles of signal TCLK and permits signal PCLK2XCAM which are up to one half the speed of signal TCLK.

Horizontal scaling filters 1030 for chroma data are similar in construction. However, since the transmission rate for U or V values is half the transmission rate of Y values in the 4:2:2 protocol; a single filter circuit 1023 can process both U and V data. Accordingly, scaling filter 1030 contains two shift registers, one for U data and one for V data, but is otherwise substantially the same as scaling filter 1020.

Figure 10C:
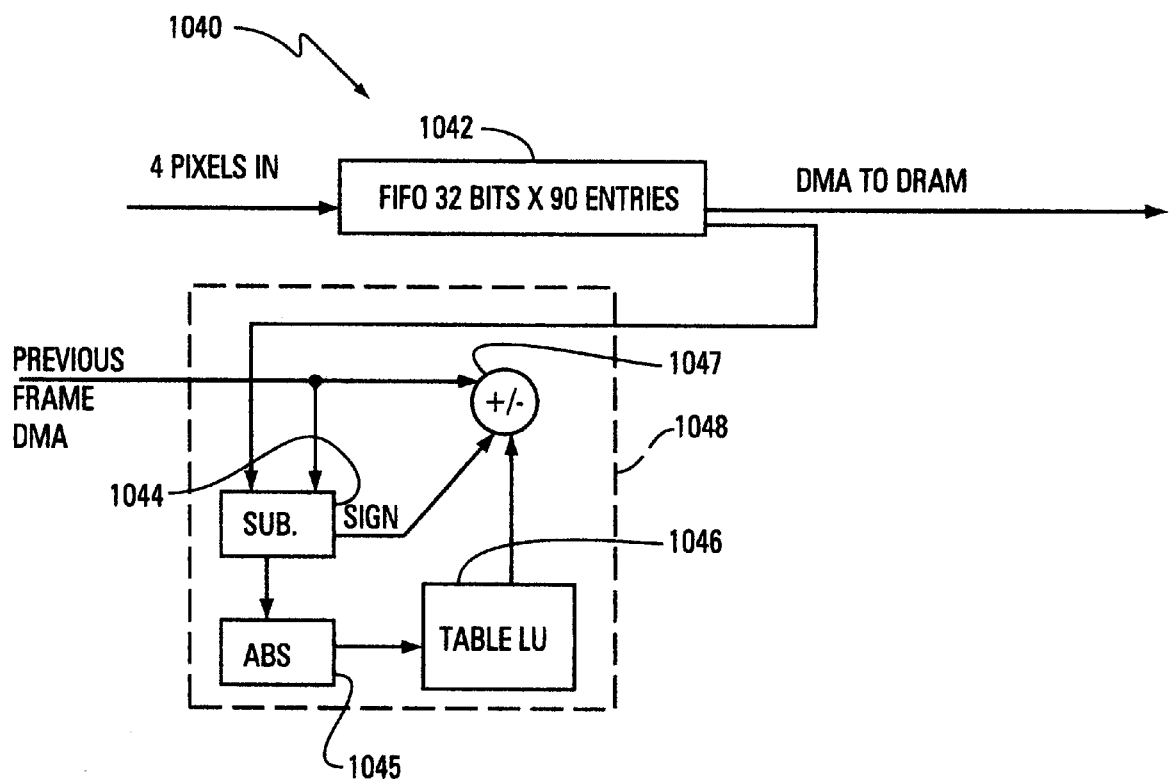

After data is scaled horizontally, lumina data is passed to temporal filter 1040, and chroma data is passed to chroma decimators 1050. FIG. 10C shows a block diagram of an embodiment of temporal filter 1040. Four 8-bit pixel values from scaling filter 1020 provide a single 32-bit word which is stored in a FIFO buffer 1042. In one embodiment, FIFO buffer 1042 contains 90 entries. DMA controller 296 moves 32-bit words from FIFO 1042 to a buffer in memory 140 for subsequent processing by video processor 280. If RISC processor 220 enables temporal filtering, a temporal filter circuit 1048 filters pixel values before the pixel values are moved from FIFO buffer 1042. The filter operation performed on a lumina pixel value Pin to generate a pixel value Pout is $$Pout=A*Pin+(1-A)*Pin^{-1}=Pin+B*(Pin^{-1}-Pin)$$

where: A is a fraction; B is equal to 1−A; and $Pin^{-1}$ is a pixel value from the preceding frame, at the same position as pixel value Pin. DMA controller 296 has a DMA channel for retrieving pixel value $Pin^{-1}$ from memory 140.

In the exemplary embodiment, temporal filter circuit 1048 adds value $B*(Pin^{-1}-Pin)$ to value Pin in FIFO buffer 1042. A subtractor 1044 determines a difference $(Pin^{-1}-Pin)$, and a circuit block 1045 determines an address to a look-up table 1046 from the absolute value of the difference. Look-up table 1046, which is stored in RAM inside filter circuit 1046, provides a value $B*|Pin^{-1}-Pin|$ which adder/subtractor 1047 adds or subtracts from value Pin. Temporal filter circuit 1048 is sufficiently fast to filter one pixel value per cycle of signal TCLK.

Figure 10D:
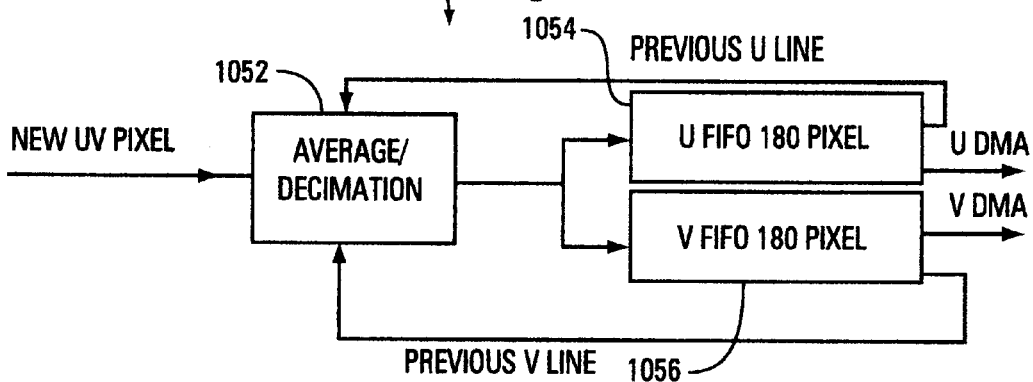

Chroma decimator 1050 when enabled converts a YUV video signal in the 4:2:2 format to a YUV signal in the 4:2:0 format which is the format used by MPEG, H.261 and most video compression processes. The 4:2:2 format contains a U pixel value and a V pixel value for every two Y pixel values. In the 4:2:0 format, U and V value in two adjacent lines are averaged to cut the number of U and V values in half. FIG. 10D shows a block diagram of an embodiment of the UV chroma decimator 1050. Chroma decimator 105 contains a FIFO buffer 1054 for U pixel data and a FIFO buffer 1056 for V pixel data. Each FIFO buffer 1054 and 1055 has sufficient capacity for a full line of chroma data. Initially, a full line of pixel values feed unchanged from horizontal filter 1030, through an average/decimation circuit 1052, to fill FIFO buffers 1054 and 1056. When a next line of U and V data begins feeding into average/decimation circuit 1052, circuit 1052 determines the average of a new U or V value and a corresponding U or V value from the previous line stored in FIFO buffer 1054 or 1056. The resulting average is stored into FIFO buffer 1054 or 1056. When the last pixel value in a line of a frame is averaged, DMA controller 296 controls two DMA channels which transfer data from FIFO buffers 1054 and 1056 to U and V buffers in memory 140. While data is being DMA transferred out of buffers 1054 and 1056, the next line of U and V data is feeding unchanged into FIFO buffers 1054 and 1056. Decimation proceeds in this fashion transferring average U and V data every other line of a frame.

Video processor 280 uses software controlled compression technique to compresses the Y, U, and V input pixel data which was transferred from video input interface 211 to respective data buffers in memory 140. Video processor 280 also decompresses compressed data and stores the video data in decompressed for in Y, U, and V buffers in memory 140. After decompressing video data, video processor 280 performs post-decompression processing For example, a de-blocking or smoothing filter can be applied to decoded frames to improve the picture quality. Such filters reduce blocking artifacts often visible at low bit rates. Video processor 280 can then interpolate any number lines to scale up a frame to a desired size. For example, video processor 280 can convert QCIF resolution video to CIF, or CIF resolution video to NTSC or to scale a decoded frame to fit in an arbitrary-sized window in a Graphical User Interface (GUI). Next, frames from video input interface can be decimated, mirrored, and/or inlaid into a decoded frame in order to implement a picture-in-picture (PIP) function. The size of the PIP, its position on the screen and the mirroring of the PIP image are all controllable by software.

Software control is also available for graphics and text overlay. RISC processor 220 can program DMA controller 296 to transfer data representing a block from one frame or character fonts data into another frame stored memory 140. Thus, software replaces dedicated graphics hardware and allows graphics and noise filter to be enabled at the same time.

Once video processor 280 performs the desired decompression and post processing DMA controller 296 moves decompressed data to video output interface 212 which provides a digital video signal for display. Video output interface 212 also contains hardware resources for post processing of video data.

Figure 11:
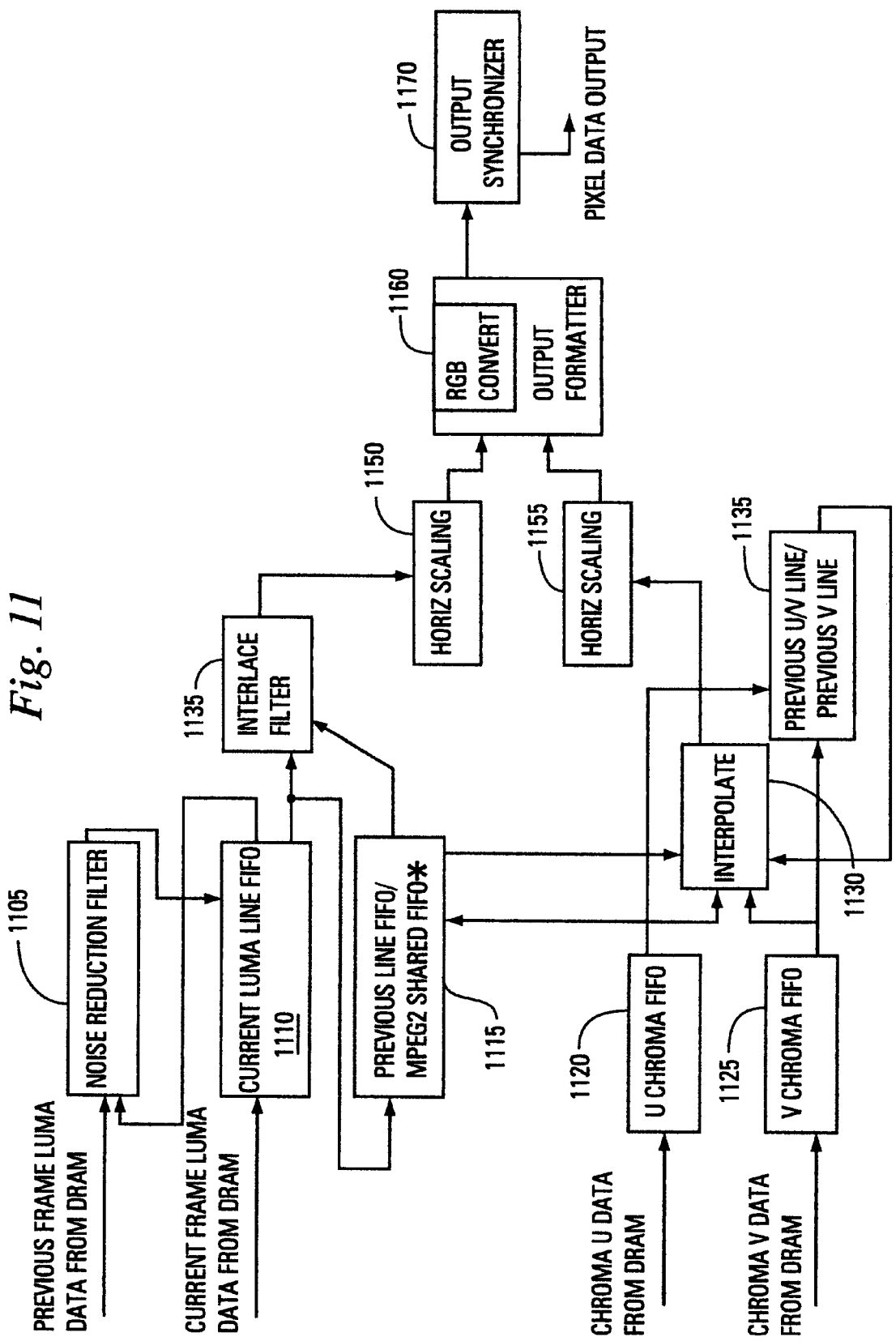
FIG. 11 is a block diagram of post-processing resources in a video output interface.

FIG. 11 shows a block diagram of an embodiment of post-processing circuits in video output interface 212. Video data from Y, U, and V buffers in memory 140 are sent to video output circuit 212 through four DMA channels. Three DMA channels, one for lumina (Y) and two for chroma (U and V) components of the current frame, fill line FIFO line buffers 1110, 1120, and 1125, respectively. If noise reduction is enable, and a fourth DMA channel provides lumina data from the previous frame to a noise reduction filter 1105. Noise reduction filter 1105 filters lumina data from FIFO buffer 1110 with lumina data from the previous frame. In one embodiment, noise reduction filter 1105 is substantially identical to filter circuit 1048 which is in video input interface 211 and described above in regard to FIG. 10C.

Lumina data from FIFO buffer 1110, noise filtered or otherwise, feeds into an interlace filter 1135 and a line buffer 1115. RISC processor 220 enables interlace filter 1135 if output video data is display on an interlaced monitor. For example, a 30 frame per second video signal can be displayed on a 60 frame per second. interlaced monitor by generating two frames for the monitor from each frame. Interlaced monitors display (or refresh) odd lines on the screen for odd numbered frames and event lines on the screen for even numbered frames. Interlace filter 1135 operates in two modes, odd-frame mode and event frame mode. In odd-frame mode, each output line from interlace filter 1135 is a weighted average of the current line from line buffer 1110 and the previous line from line buffer 1115, where the current line has three times the weighting of the previous line. In even-frame mode, each output line from interlace filter 1135 is a weighted average of the current line from line buffer 1110 and the previous line from line buffer 1115, where the previous line has three times the weighting of the current line. Interlace filter 1135, which generates even and odd fields from decoded frames for displays such as TV screens, reduces jitter which is sometime apparent on interlaced displays and improves both the spatial and temporal appearance of decoded images on interlaced displays.

An additional mode of interlace filter 1135 provides a evenly weighted average of the current and previous lines. If interlace filter 1135 is disabled, data from line buffer 1110 is unaltered by interlace filter 1135, and no data is feed from line buffer 1110 to line buffer 1115. Accordingly, when interlace filter 1135 is disabled line filter 1115 is available for other uses.

Chroma data from line buffers 1120 and 1125 are processed in parallel with lumina data from line buffer 1105. An interpolation circuit 1130 converts pixel data which is in the 4:2:0 color format to the 4:2:2 format which increases the resolution of the chrominance components by a factor of 2 in the vertical dimension. For example, interpolation circuit 1130 converts from the H.261 and MPEG chrominance sub-sampling to that used by CCIR 601.

Interpolation circuit 1130 uses bi-linear interpolation. In operation, U pixel values and V pixel values are processes in interleaved fashion by alternately asserting U then V data to interpolation circuit 1130. Each line of U and V data is asserted to interpolation circuit twice. The first time the line of U and V data is asserted, interpolation circuit 1130 performs a weighted average of a new (asserted) pixel value (U or V) and a corresponding previous pixel value from a line buffer 1135. The weighted average is three quarters of the previous value and one quarter of the new pixel value and forms a pixel value for a first interpolated line which is sent to a horizontal scaling filer 1155.

The second time the line of U and V data is asserted to interpolation circuit, interpolation circuit 1130 performs a weighted average which is three quarters of the new value and one quarter of the previous pixel value. The resulting weighted averages form a second interpolated line which is sent to a horizontal scaling filer 1155. The new value is then stored in line buffer 1135 for calculation of the next two interpolated lines.

When interlace filter 1135 does not use line buffer 1115, interpolation filter 1130 can use line buffer 1115 for U data and line buffer 1135 for V data. This provides longer line buffers which may be required for some protocols such as MPEG 2, which have longer line lengths.

Lumina pixel data from interlace filter 1135 and chroma data from interpolation circuit are respectively fed to horizontal scaling filters 1150 and 1155. Horizontal scaling filters 1150 and 1155 scale input data from a line length for an input frame to a line length for an output frame. In one embodiment of the invention, horizontal scaling filters 1150 and 1155 are substantially identical to scaling filter 1020 described in regard to FIG. 10B. The scaling ratio for output data is permitted to range between 0.25 and 4.0.

A output formatter 1160, if enabled, converts scaled YUV data to another format for color representation. For example, output formatter 1160 can convert YTJV pixel data to RGB (red, green, blue) pixel data for an external chip set or monitor which uses RGB color data. The RGB format can be either 16-bits or 24-bits time multiplexed (16 bits then 8 bits) onto the 16-bit video output interface. An output synchronizer synchronizes the output video data with an external pixel clock signal PCLK2XSCN from the external device, or for time multiplexed 24-bit RGB color to twice the pixel clock frequency.

Video output interface 212 also contains a programmable CRT controller which handles interlaced and progressive scanning. The CRT controller is programmable to generate video syncs and blanks or to genlock to an external video source.

Although the present invention has been described with reference to particular embodiments, the description is only an example of the invention's application and should not be taken as a limitation. Various adaptations and combinations of features of the embodiments disclosed are within the scope of the present invention as defined by the following claims.

APPENDIX A

This appendix describes additions to the MIPS-X instruction set that improve handling of 8-bit and 16-bit values. RISC processor 220 of FIG. 3 supports byte (8-bit) and short (16-bit) data in addition to the word (32-bit) data originally supported by MIPS-X instructions. The 32-bits, DBUS [31:0], on data bus 204 are split into four bytes. DBUS [31:24] IS byte 0, DBUS[23:16] IS byte 1, DBUS[15:8] is byte 2; and DBUS[7:0] is byte 3. DBUS[31:16] is short 0, and DBUS[15:0] is short 1.

The new data types are used in six new instructions to the MIPS-X native instruction set—load byte, store byte, load short, store short, signed load byte, and signed load short. The unsigned load and store instructions create and operate on unsigned, LSB-justified values in register file 340. The signed load instructions sign-extends the most significant bit of the current data type to all more significant bits.

For example, in doing a load byte operation on byte 1 at a location in memory, RISC processor 220 moves DBUS [23:16] to the register file bits [7:0], and zero-out bits [31:8] of that register. Similarly, when storing this data out to memory (with a store byte instruction to byte 2 in memory), the contents of register file bits [7:0] will appear on DATA-BUS pins [15:8]. Table A1 provides the added instructions definition.

TABLE A1

New Instructions

| Instruction | Code | Description |
|---|---|---|
| load byte | lb | Reg(Dest) [7:0] <== Memory[SignExtend(Offset) + Reg(Src1)] |
| store byte | sb | Memory[SignExtend(Offset) + Reg(Src1)] <== Reg(Src2) [7:0] |
| load short | ls | Reg(Dest) [15:0] <== Memory[SignExtend(Offset) + Reg (Src1)] |
| store short | ss | Memory[SignExtend(Offset) + Reg(Src1)] <== Reg(Src2) [15:0] |
| signed load byte | slb | Reg(Dest) [7:0] <== Memory[SignExtend(Offset) + Reg(Src1)]; and Reg(Dest) [31:8] <== Reg(Dest) [7] |
| signed load short | sls | Reg(Dest) [15:0] <== Memory[SignExtend(Offset) + Reg(Src1)3]; and Reg(Dest) [31:16] <== Reg(Dest) [15] |

In Table A1, Src1, Dest, and Offset are the source, destination, and offset field as defined by the MIPS-X instruction set, except that the two least significant bits of the offset field indicate a byte number, 0 to 3. The TYPE and OPERATION fields for the instructions are:

lb TY=10 OP=100
sb TY=10 OP=011
ls TY=10 OP=001
ss TY=10 OP=110
slb TY=10 OP=101
sls TY=10 OP=111

The addition of the byte and short data types also requires the addition of a new exception: an ALIGNMENT exception. An alignment exception occurs if a user writes a short or a full word to an address that is not properly aligned (specifically, a half-word access across bytes 1 and 2 or a 32-bit word access across any sequence of bytes not aligned on a word boundary) The exception is internal behaves identically to an overflow exception in ALU 332. An alignment exception is identified and controlled by four new bits, PSW[27:24] or lLaA, in PSW register 336. Bits L and A are in PSWcurrent (the current status word), and bits 1 and a are in PSWother (the saved status word during an interrupt). Bit L (PSW[26]) is the alignment exception mask bit. Traps due to misaligned word or half-word accesses are prevented when bit L is set. If bit L is clear, RISC processor 220 traps to address 0 when an alignment exception occurs. The exception handling routine should begin the alignment trap handling routine if the alignment flag (A) is set in PSW current. Bit A can only be changed while in system space, so a system call is required for user space programs to set or clear bit A.

APPENDIX B

This appendix describes features of an exemplary embodiment of an embodiment of the intention which is VCP 110 shown in FIG. 2. VCP 110 is a monolithic integrated circuit which conventionally packaged in a 240-pin package. Table B1 describes the pins of integrated VCP 110.

TABLE B1

Pin Description

| Name | I/O | Definition |
|---|---|---|
| LOE# | O | RISC Port output enable |
| LCE#[3:0] | O | RISC Port chip enables. RISC boots from internal ROM or LCE# = 0x03 depending on the value of ROMDIS. |
| LWRLL# | O | RISC port write enable byte 0 |
| LWRLH# | O | RISC port write enable byte 1 |
| LWRHL# | O | RISC port write enable byte 2 |
| LWRHH# | O | RISC port write enable byte 3 |
| LD[31:0] | I/O | RISC port data bus |
| LA[19:0] | O | RISC port address bus |
| RESET# | I | System reset (active low). Must be low for at least 16 clock cycles to ensure chip reset. |
| CPUCLK | 1 | RISC and System clock input |
| DEBUGIRQ | I | System debug interrupt |
| ROMDIS | I | Disable the internal boot ROM and boot from external ROM located at LCE#=0x03 |
| TEST2 | O | Test output (phase 45) |
| TEST1L | I | Test input (extpII) |
| AUX[3:0] | I/O | Auxillary Control Lines |
| HIRQ | O | Host Interrupt Request, Indicates an interrupt from the VC to the host. |
| HWRREQ# | O | Host DMA channel Write Request |
| HRDREQ# | O | Host DMA channel Read Request |
| HD[15:0] | I/O | Host Data Bus. Compressed data is passed to and from the VC across this bus. Its also used to pass commands and parameters from the host to the VC. |
| HA[2:0] | I | Host Address Bus. This bus is used by the host to address one of eight registers in the host interface. |
| HREAD# | I | Host Read. Enables data from the host interface onto the HDATA[15:0]bus. |
| HWRITE# | I | Host Write. Latches data from the HDATA[15:0]bus into the host interface registers. |
| VSYNCCAM | I | Vertical Sync for Camera Video port. Programmable for rising of falling edge. |
| HSYSNCCAM | I | Horizontal Sync for Camera Video port. Programmable for rising or falling edge. |
| ODDCAM | I | Odd/Even field select for Camera Video port |
| PCLK2XCAM | I | Pixel Clock; two times the actual pixel clock for Camera Video port |
| PCLKQCAM | I | Pixel Clock qualifier in for Camera Video port |
| YCAM[7:0] | I | Y Luminance data bus for Camera Video port |
| UVCAM[7:0] | I | UV Chrominance data bus for Camera Video port |
| VSYNCSCN | I/O | Vertical Sync for Screen Video port Programmable for rising or falling edge |

TABLE B1-continued

Pin Description

| Name | I/O | Definition |
|---|---|---|
| HSYNCSCN | I/O | Horizontal Sync for Screen Video port Programmable for rising or falling edge |
| BLANKSCN | O | Blanking for Screen Video port |
| PCLK2XSCN | I | Pixel Clock; two times the actual pixel clock for Screen Video port |
| PCLKQSCN | I | Pixel Clock qualifier in for Screen Video port |
| YSCN[7:0] | O | Y Luminance data bus for Screen Video port |
| UVSCN[7:0] | O | UV Chrominance data bus for Screen Video port |
| RAS# | O | Reference DRAM Row Address Strobe |
| CAS0# | O | Reference DRAM Column Address Strobe bank 0 |
| CAS1# | O | Reference DRAM Column Address Strobe bank 1 |
| DA[9:0] | O | Reference DRAM Multiplexed Address |
| DWE# | O | Reference DRAM Write Enable |
| DOE# | O | Reference DRAM Output Enable |
| DBUS[31:0] | I/O | Reference DRAM Data Bus |
| ACLK | I | Audio Port Serial Clock |
| AIN | I | Audio Port Serial Data In |
| AOUT | O | Audio Port Serial Data Out |
| ARFS | I | Audio Port Receive Frame Sync |
| ATFS | I | Audio Port Transmit Frame Sync |
| TDMCLK | I | TDM Bus Serial Clock |
| TDMDR | I | TDM Bus Serial Data Receive |
| TDMDX | O | TDM Bus Serial Data Transmit |
| TDMFS | I | TDM Bus Frame Sync |
| TDMTSC# | O | TDM Bus Tristate Control; used to enable external driver for TDMDX |

Different segments of VCP 110 use different clock signals. Clock signal CPUCLK is the main system input clock signal to VCP 110 and is used to derive a clock signal TCLK for DRAM bus timing and clock signal VPCLK for video processor 280. RISC processor 220 executes one instruction per cycle ti of signal CPUCLK. H.221/242/BCH resources 240, DMA controller 206, and I/O resources 213, 214, and 215 also use clock signal CPUCLK. Clock signal VPCLK for video processor 280 is generated on board VCP 110 and is ×1, 4/3×, or 2× the frequency of signal CPUCLK. (VCP chips are speed graded for the maximum frequencies of both signals CPUCLK and VPCLK.) Clock signal TCLK is twice the frequency of clock signal CPUCLK and times access memory 140 and various video processing resources.

Pixel clock signals PCLK2XCAM and PCLK2XSCN, an audio clock signal ACLK, and TDM clock signal TDMCLK are asynchronous signals generated by external devices connected to I/O resources of VCP 110. Signals PCLK2XCAM, PCLK2XSCN, ACLK, and TDMCLK are less than half the frequency of the clock of the resource to which they interface. To enable full 7-tap filtering, clock signal PCLK2XCAM has a frequency which is one quarter of the frequency of clock signal TCLK. In applications where filtering use fewer than seven taps, signal PCLK2XCAM can have a greater frequency.

Figure 12:
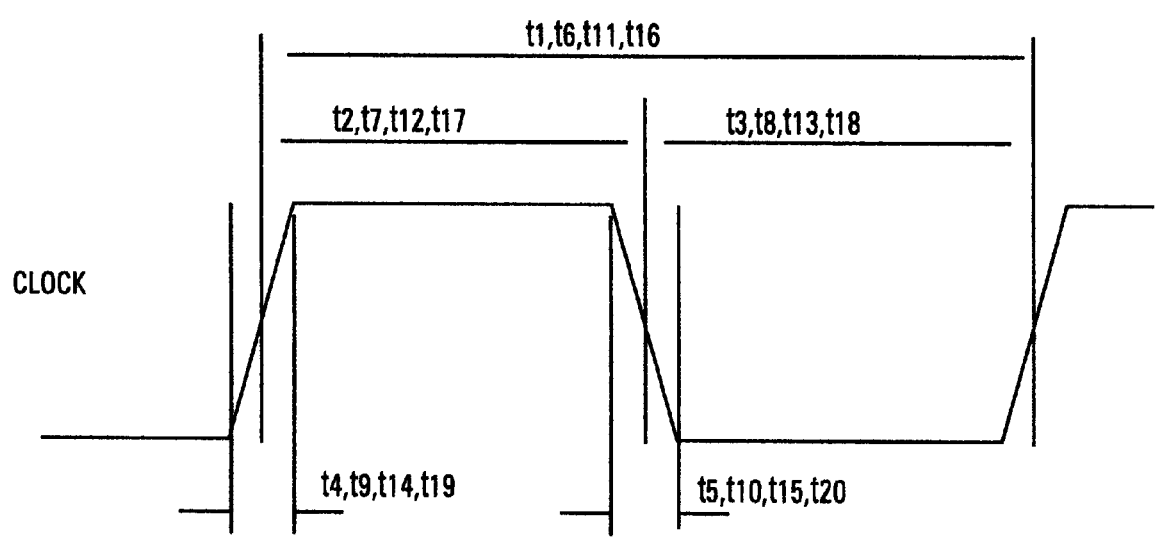
FIG. 12 illustrates the form of input clock for a VCP in accordance with an embodiment of the invention.

FIG. 12 shows a generic waveform for clock signals CPUCLK; PCLK2XCAM, PCLK2XSCN, ACLK, and TDMCLK, and Tables B2, B3, B4, and B5 indicate the lengths of time intervals in nanoseconds (ns) when signal CPUCLK has frequency 20 MHz, 30 MHz, 33 MHz, or 40 MHz.

TABLE B2

CPUCLK Timing

| Sym-bol | Des-crip-tion | 20 MHz Min | 20 MHz Max | 30 MHz Min | 30 MHz Max | 33 MHz Min | 33 MHz Max | 40 MHz Min | 40 MHz Max |
|---|---|---|---|---|---|---|---|---|---|
| t1 | Period | 50 | 100 | 33.3 | 100 | 30.3 | 100 | 25 | 100 |
| t2 | Low time | 44 | — | 28 | — | 24 | — | 21 | — |
| t3 | High time | 44 | — | 28 | — | 24 | — | 21 | — |
| t4 | Rise time | — | 8 | — | 6 | — | 3 | — | 3 |
| t5 | Fall time | — | 8 | — | 6 | — | 3 | — | 3 |

TABLE B3

PCLK2XCAM and PCLK2XSCN Timing

| Sym-bol | Des-crip-tion | 20 MHz Min | 20 MHz Max | 30 MHz Min | 30 MHz Max | 33 MHz Min | 33 MHz Max | 40 MHz Min | 40 MHz Max |
|---|---|---|---|---|---|---|---|---|---|
| t6 | Period | 50 | — | 33 | — | 30 | — | 30 | — |
| t7 | Low time | 20 | — | 15 | — | 15 | — | 15 | — |
| t8 | High time | 20 | — | 15 | — | 15 | — | 15 | — |
| t9 | Rise time | — | 3 | — | 4 | — | 4 | — | 4 |
| t10 | Fall time | — | 3 | — | 4 | — | 4 | — | 4 |

TABLE B4

ACLK Timing

| Symbol | Description | 20 MHz Min | 20 MHz Max | 30 MHz Min | 30 MHz Max | 33 MHz Min | 33 MHz Max | 40 MHz Min | 40 MHz Max |
|---|---|---|---|---|---|---|---|---|---|
| t11 | Period | 62.5 | — | 62.5 | — | 62.5 | — | 62.5 | — |
| t12 | Low time | 25 | — | 25 | — | 25 | — | 25 | — |
| t13 | High time | 25 | — | 25 | — | 25 | — | 25 | — |
| t14 | Rise time | — | 8 | — | 6 | — | 3 | — | 3 |
| t15 | Fall time | — | 8 | — | 6 | — | 3 | — | 3 |

TABLE B5

TCDCLK Timing

| Symbol | Description | 20 MHz Min | 20 MHz Max | 30 MHz Min | 30 MHz Max | 33 MHz Min | 33 MHz Max | 40 MHz Min | 40 MHz Max |
|---|---|---|---|---|---|---|---|---|---|
| t16 | Period | 62.5 | — | 62.5 | — | 62.5 | — | 62.5 | — |
| t17 | Low time | 25 | — | 25 | — | 25 | — | 25 | — |
| t18 | High time | 25 | — | 25 | — | 25 | — | 25 | — |
| t19 | Rise time | — | 8 | — | 6 | — | 3 | — | 3 |
| t20 | Fall time | — | 8 | — | 6 | — | 3 | — | 3 |

Video Interfaces

Pins YCAM[7:0] and UVCAM[7:0] into video input interface 211, and pins YSCN[7:0] and UVSCN[7:0] from video output interface 212 typically transfer luminance and chrominance (YUV) pixel data in CCIR601 pixel format (4:2:2). In this format, video data has half as many chrominance (U or V) pixels per line as luminance (Y) pixels, but as many chrominance lines as luminance lines. Video output interface 212 also has a mode for outputting pixel data in 24-bit or 16-bit RGB format.

Pixel clock signals and horizontal and vertical synchronization (sync) signals control timing in video interfaces 211 and 212. Pixel clocks clock pixels into and out of VCP 110. VCP 110 contains two independent CRT Controllers (CRTCs), one for input and one for output. The input CRTC is slaved to the timing of signal PCLKQCAM from a camera or other video source and uses horizontal and vertical sync signals HSYNCCAM and VSYNCCAM to determine when active video data is transferred. The output CRTC timing is independent and internally generated, slaved to the camera, or slaved to some other video sync source.

Video interfaces 211 and 212 contains resources for preprocessing and postprocessing video data. These resources provide programmable color conversion, scaling, and filtering functions. In order to match internal clock rates with external pixel clock rates, the resources have internal line buffers which are 360 pixels long in the Y component to and 360 samples in the U and V components to allow easy 4:2:2 to 4:2:0 conversion. Horizontal scaling converts to CCIR 601 resolutions (720×486 or 720×576 pixels in the Y component). Pictures with resolutions above CCIR 601 can be captured and displayed by VCP 110, but some hardware video processing functions cannot be performed.

Video input interface 211 contains a horizontal filter 1020. Filter 1020 is selectable to have 1, 3, 5 or 7 taps, but using more taps increases the time required for filtering and reduces the number of pixel per second that can be processed. The relationship between the PCLK2XSCN and CPUCLK is shown in Table B6.

TABLE B6

Relationship of PCLK2XCAM to CPUCLK

| Taps | Restrictions |
|---|---|
| 1 | Pixel rate < (2 × CPUCLK)/2 |
| 3 | Pixel rate < (2 × CPUCLK)/2 |
| 5 | Pixel rate < (2 × CPUCLK)/3 |
| 7 | Pixel rate < (2 × CPUCLK)/4 |

Table B7 shows a sample of video pre-processing applications. In many applications, the digital video 10 is provided by a digital TV chipset which typically provides either CCIR 601 resolution (704×240 luminance pixels) or "square pixel" formats (640×480) which are more suitable for computer displays. The scaling capabilities of VCP 110 accept either format. For H.261 applications, video processor 280 scales not only between the 240 lines of NTSC to the 288 lines of CIF, but also reduce CIF to QCIF for low-bit rate operation or compatibility with small-screen video phones.

TABLE B7

Video Pre-processing Applications

| Application | Standalone Video Phone | PC Video Conferencing | MPEG 1 Encode | M-JPEG Encode |
|---|---|---|---|---|
| Input Video Format | CCIR 601 720 × 243 | 640 × 480 | CCIR 601 720 × 243 | 640 × 480 |
| Horizontal Scaling | CIF 720 −> 352 | CIF 640 −> 352 | SIF 720 −> 352 | — |
| UV Vertical Scaling | ✓ | ✓ | ✓ | ✓ |
| Temporal Filtering | ✓ | ✓ | — | — |
| Vertical Scaling | CIF 240 −> 288 lines QCIF 240 −> 176 lines | CIF 240 −> 288 lines QCIF 240 −> 176 lines | — | — |
| DRAM Video Format | CIF or QCIF | CIF or QCIF | SIF | 640 × 480 YUV |

Table B8 shows a sample of video post-processing applications. As with the pre-processing resources, the post-processing resources can scale to both the CCIR 601 (720×243 or 720×288 pixels per field) resolutions used by TV displays and the "square pixel" format used for computers. For PC applications, external overlay or inlay circuits combine the VCP video in a graphic user interface. In such cases the VCP post-processing provides arbitrary scaling to fit the video in a GUI window.

TABLE B8

Video Post Processing Applications

| Application | Standalone Video Phone | PC Video Conferencing | MPEG Decode | PC M-JPEG Decode |
|---|---|---|---|---|
| DRAM Video Format | CIF or QCIF | CIF or QCIF | SIF | 640 × 480 YUV |
| Deblocking Filter | ✓ | ✓ | — | — |
| Vertical Scale | QCIF 176 -> 240 lines CIF 288 -> 240 lines | QCIF 176 -> arbitrary CIF 288 -> arbitrary | — | 480 lines -> arbitrary |
| PIP | ✓ | ✓ | — | — |
| NR/Graphics | Graphics overlay | Noise Reduction | Graphics overlay | — |
| Interlacing | ✓ | — | ✓ | — |
| UV Vert Interpolate | ✓ | ✓ | ✓ | ✓ |
| Horizontal Filtering | QCIF 176 -> 704 CIF 352 -> 720 | QCIF 176 -> arbitrary CIF 352 -> arbitrary | 352 -> 720 | 640 pixels -> arbitrary |
| YUV -> RGB Output Video Format | — CCIR 601 704 | ✓ Variable window size Square pixel RGB | ✓ 720 × 240 RGB | ✓ Variable window size Square pixel RGB |

Video Timing

Figure 13:
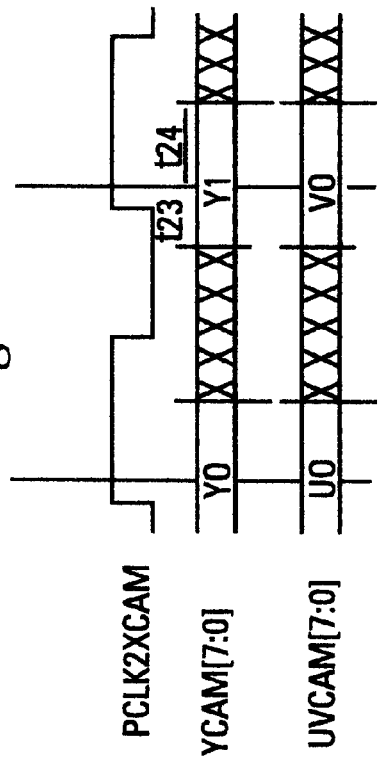
FIGS. 13 and 14 are timing diagrams of double clock input and output operations for pixel data.
Figure 14:
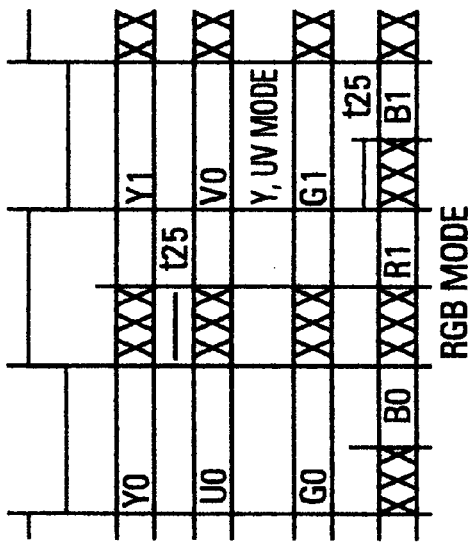

FIGS. 13 shows the timing of pixel transfers through video input interface 211 using pixel clock PCLK2XCAM at twice the actual pixel rate with clock qualifier PCLKQCAM. FIGS. 14 shows the timing of pixel transfers through video output interface 212 using pixel clock PCLK2XSCN at twice the actual pixel rate with clock qualifier PCLKQSCN. The double clock is typically used for TV displays, the single for computer displays. FIGS. 15 and 16 show video input and output interface 211 and 212 timing using a single pixel clock PCLK2XSCN or PCL2XCAM. Signals PCLKQSCN and PCLKQCAM are ignored in this mode. For both interfaces 211 and 212, the maximum double and single pixel clock is 33 MHz or the frequency of signal CPUCLK, whichever is lower.

The timing of the syncs, blanking, and odd/even field indication are shown in FIGS. 17, 18, and 19. The output video field indication is done by modifying the relative positions of VSYNCSCN and HSYNCSCN.

At the start of an even field, the horizontal and vertical sync pulses start on the same clock edge, in odd fields the horizontal sync pulse is delayed by one clock cycle. The sense of both horizontal and vertical syncs is programmable.

Table B9 shows the detailed AC timing for video input and output interfaces 211 and 212. In Table B9, PCLK indicates pixel clock signals PCLK2XCAM and PCLK2XSCN, PQCLK indicates clock qualifiers PCLKQCAM and PCLKQSCN, and times are indicated in units of ns.

TABLE B9

Video Input and Output Interface Timing

| | | 20 MHz | | 30 MHz | | 33 MHz | | 40 MHz | |
|---|---|---|---|---|---|---|---|---|---|
| | Description | Min | Max | Min | Max | Min | Max | Min | Max |
| t6 | PCLK period | 50 | — | 33 | — | 30 | — | 30 | — |
| t21 | PQCLK setup time to PCLK2X | 6 | — | 6 | — | 6 | — | 4 | — |
| t22 | PQCLK hold time to PCLK | 2 | — | 2 | — | 2 | — | 2 | — |
| t23 | Video data and syncs setup time to PCLK | 6 | — | 6 | — | 6 | — | 4 | — |
| t24 | Video data and syncs hold time to PCLK | 2 | — | 2 | — | 2 | — | 2 | — |
| t25 | Video data and syncs output delay time to PCLK2XSCN | 0 | 2 | 0 | 2 | 0 | 2 | 0 | 2 |

DRAM Buffers and Memory Interface

Memory 140 is a DRAM buffer for storing uncompressed images, reference frames, and intermediate data. When VCP 110 is encoding, DMA controller 296 stores captured video frames in raster format in three separate buffers in memory 140 corresponding to the Y, U, and V components. Similarly, memory 140 holds decoded images to be displayed. When both encoding and decoding, reference images and partially compressed data are also stored in memory 140.

Figure 20:
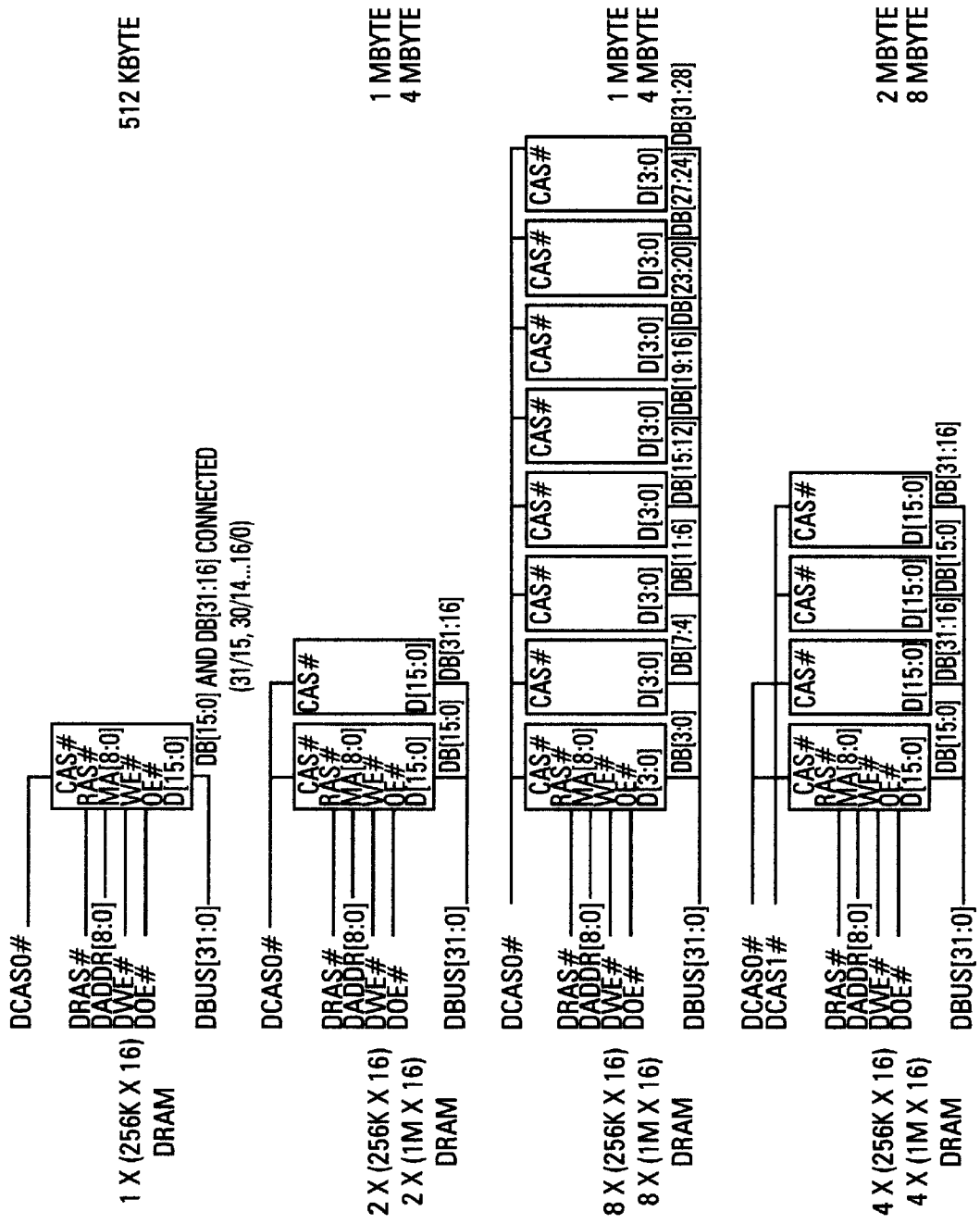
FIG. 20 contains schematic diagrams of four DRAM configurations for the video compression processor of FIG. 2.

Memory interface 292 controls memory 140 and can interface to DRAM chips organized ×16, ×4 and ×1 bit wide. FIG. 20 shows some example configurations of DRAM chips connected memory interface 292. Memory interface 292 is 32-bits wide and, at high VCP clock speeds, provides sufficient bandwidth to decode and display CCIR601 resolution images at 60 frames per second. For less demanding applications such as MPEG1 SIF resolution decode or H.261 QCIF codec, the bus can operate in a 16-bit mode. In 16-bit mode, a single 256 k×16 DRAM chip is sufficient. The most significant and least significant 16-bits of the DBUS[31:0] should be connected (i.e. bit 31 to bit 15, bit 30 to bit 14, etc.).

Figure 21:
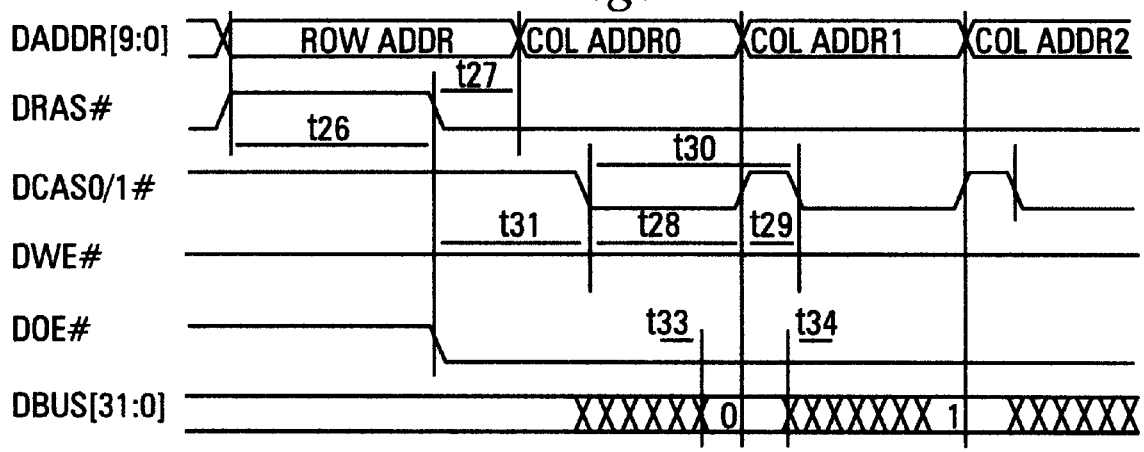
FIGS. 21 and 22 are timing diagrams for read and write operation of a DRAM interface.
Figure 22:
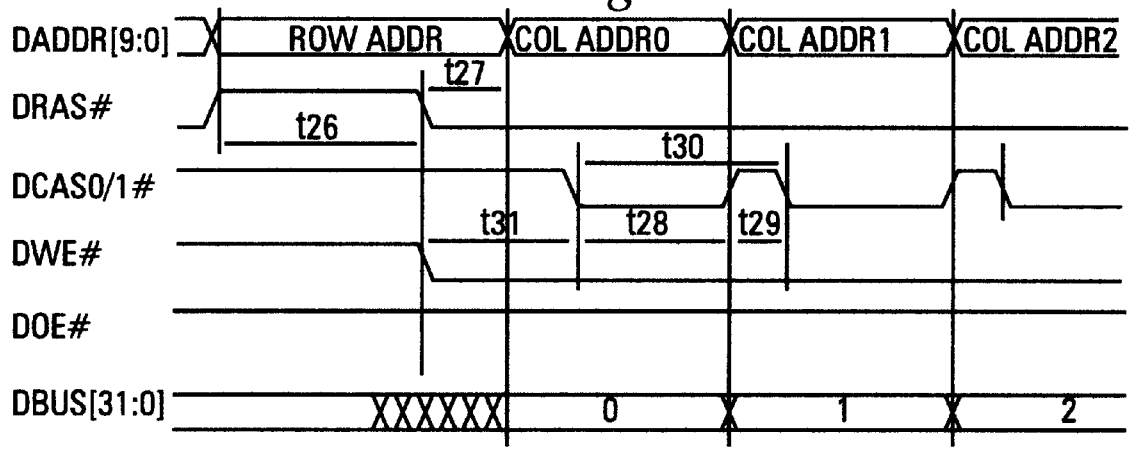

Memory interface 292 is programmable to support DRAMs with a variety of page mode cycle times, RAS to CAS delay times, and RAS precharge times. Table B10 and FIGS. 21 and 22 show the DRAM output signal timing. Output signals may also be skewed in relation to each other which is taken into account when choosing DRAM for an application. The DRAM output signal skews are listed in Table B11.

Memory interface 292 uses page mode accesses whenever possible and takes care of DRAM refresh and uses RAS only refresh mode. The refresh period is programmable. The page mode cycle time of DRAMs varies from one manufacturer to another. A typical 70 ns DRAM has a page mode cycle time of 40 ns. If signal CPUCLK has frequency 33 MHz, a 3 T cycle takes 45 ns which will meet the specifications of the 70 ns DRAM. When operating with 2 T page mode cycle times with a 33 MHz VCP, the burst transfer rate of the DRAM interface is 128 Mbytes/s.

TABLE B10

DRAM Interface Logical Timing

| Symbol | Description | Programmable Min | Max |
|---|---|---|---|
| t26 | RAS precharge time | 3T | 5T |
| t28 | Row address hold time | 1T | 3T |
| t28 | CAS pulse width low | 1T | 2T |
| t29 | CAS pulse width high | 1T | 2T |
| t30 | Fast Page Mode access time | 2T | 4T |
| t31 | RAS to CAS delay time | 2T | 4T |

*1T = Internal PLL clock cycle

TABLE B11

DRAM Inteface Skew Timing

| | | 20 MHz | | 30 MHz | | 33 MHz | | 40 MHz | |
|---|---|---|---|---|---|---|---|---|---|
| Time | Description | Min | Max | Min | Max | Min | Max | Min | Max |
| t32 | DRAM port output signal skew | 0 | 3 | 0 | 3 | 0 | 3 | 0 | 3 |
| t33 | Read cycle data setup time to CAS rising edge | 5 | — | 5 | — | 3 | — | 3 | — |
| t34 | Read cycle data hold time to CAS rising edge | 0 | — | 0 | — | 0 | — | 0 | — |

SRAM Memory Interface

Figure 23:
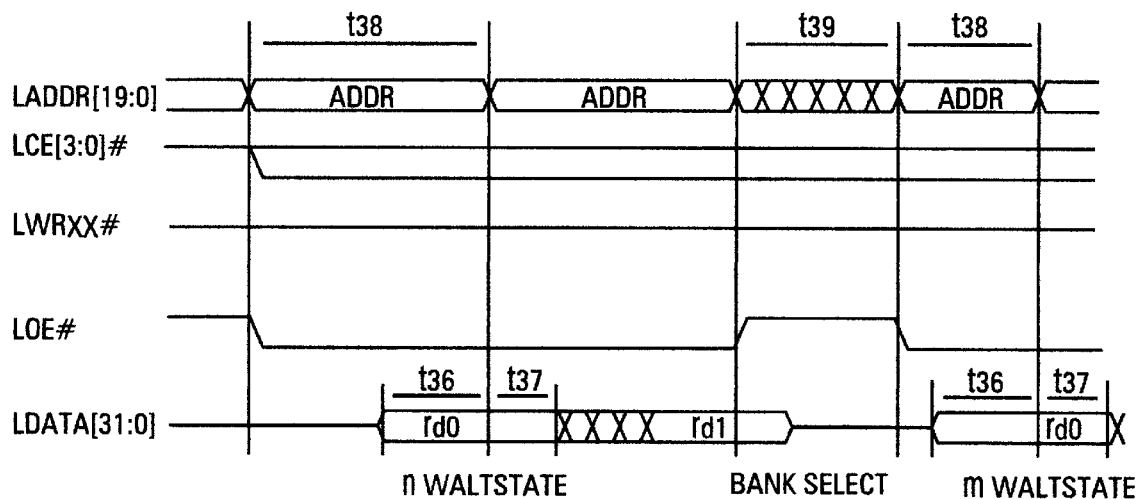
FIGS. 23 and 24 are timing diagrams for read and write operation of an SRAM interface.
Figure 24:
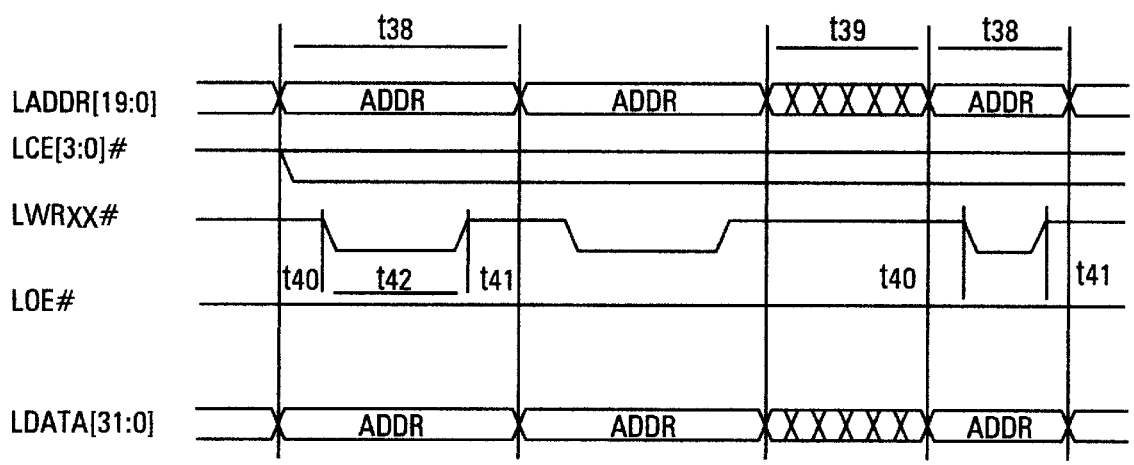

The timings of read and write operations through memory interface 202 are shown in FIGS. 23 and 24. From 0 to 32 wait states are inserted in each read or write cycle. Each wait state is one cycle T of clock signal CPUCLK. All accesses by DMA controller 206 have a minimum of one wait state inserted by memory interface 202. RISC processor 220 accesses can be zero wait state. A memory bank for RISC processor 220, when running at 0 wait state and 33 MHz, supports a write pulse width less than or equal to 15 ns. Lower speeds are used with slower memory banks. When switching from a slow bank to a fast bank, the turn off delay of the slow bank may overlap the first access of the fast bank. To prevent data corruption, a bank select delay time t39 is programmable for each bank from 0 to 3 T states. See Table B12 for details.

TABLE B12

SRAM Interface Output Signal Logic Timing

| | | Programmable | |
|---|---|---|---|
| Time | Description | Min | Max |
| t38 | SRAM access time | 1T | 33T |
| t39 | Bank Select delay time | 0T | 3T |
| t40 | Address setup time to write strobe | 0.25T | 0.25T |
| t41 | Address hold time to write strobe | 0.25T | 0.25T |
| t42 | Write strobe pulse width low | 0.5T | 32.5T |

*1T-CPUCLK pin cycle, Each Wait-state = 1T

Signals for memory interface 202 are generated from signal CPUCLK and are timed in integer multiples of cycles of signal CPUCLK, except for the write strobe, which is delayed by one quarter cycle from the address setup and advanced one quarter cycle from the start of the next access cycle. Table B13 shows details of signal skew may vary with the frequency of signal CPUCLK.

TABLE B13

SRAM Interface Output Signal Skew Timing

| | | 20 MHz | | 30 MHz | | 33 MHz | | 40 MHz | |
|---|---|---|---|---|---|---|---|---|---|
| Time | Description | Min | Max | Min | Max | Min | Max | Min | Max |
| t35 | SRAM port output signal skew | 0 | 3ns | 0 | 3ns | 0 | 3ns | 0 | 2ns |
| t36 | Read cycle data setup time to date latch | 6ns | — | 6ns | — | 6ns | — | 4ns | — |
| t37 | Read cycle data hold time to data latch | 2ns | — | 2ns | — | 2ns | — | 2ns | — |

TDM Interface

TDM interface 215 implements a five-wire serial bus for connection between VCP 110 and available communications chips. TDM interface 215 is a time division multiplexed interface which multiplexes data on up to 64 channels. Each channel is allocated a different time slot, and VCP lo is set to send or receive data on any combination of different time slots. Data is assumed to be ordered by time slot (i.e. if timeslots 6, 8 and 17 are used, the first byte that DMA controller 206 transfers to memory 150 is the byte in time slot 6, followed by 8 and 17.) Reordering can be done in software.

TDM interface 215 includes a frame sync line TDMFS, data transmit and receive lines TDMDX and TDMDR, external buffer enable TDMTSC#, and a clock line TDMCLK. Frame sync and clock signals are inputs to VCP 110, so the timing of the data transfer is externally controlled. TDM interface 215 transfers data at a maximum rate of 16 Mbits/s, but a more typical configuration supports up to 4.096 Mbits/s with a TDMFS frequency of 8 KHz.

TDM interface 213 supports a number of different timings which are described in Table B14. TDM interface 215 is flexible enough to interface to a wide range of communications chips for ISDN, PABX, LAN and WAN connectivity. In particular, TDM interface 215 can interface directly to chips which support the Concentration Highway Interface (CHI), ISDN Oriented Modular Revision 2 (IOM-2) interface and Multi-Vendor Integral Protocol (MVIP).

TABLE B14

TDM Interface Programmability

| Symbol | Description |
|---|---|
| TDMCTL.sel2x | Serial clock 2x or 1x select |
| TDMCTL.clkphase | 2x Serial clock phase to rising edge of TDMFS |
| TDMCTL.fe | Selects edge of serial clock to use when sampling TDMFS |
| TDMCTL.rce | Selects edge of serial clock to use when sampling TDMDR |
| TDMCTL.xce | Selects edge of serial clock to use when driving TDMDX |
| TDMCTL.xmitEndian | Selects little or big endian data type trasmit |
| TDMCTL.rcvEndian | Selects little or big endian data type receive |

Figure 25:
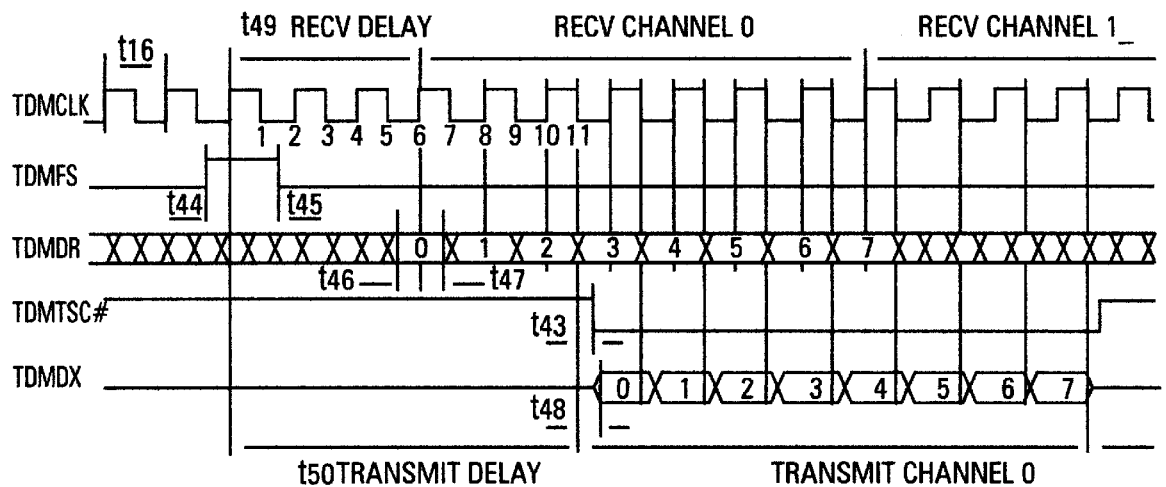
FIGS. 25, 26, and 27 are a timing diagram for operation of a time division multiplexed serial interface, a serial audio interface, and a host interface.

A timing diagram for a particular configuration is shown in FIG. 25 and described in Tables B14 and B15. TDM interface 215 programmability includes independent receive, transmit and frame sync clock edge selection and independent receive and transmit data offsets as illustrated in Table B15.

TABLE B14

TDM Interface Timing

| | | 20 MHz | | 30 MHz | | 33 MHz | | 40 MHz | |
|---|---|---|---|---|---|---|---|---|---|
| Time | Description | Min | Max | Min | Max | Min | Max | Min | Max |
| t16 | TDMCLK period | 100 | — | 62.5 | — | 6.5 | — | 62.5 | — |
| t43 | TDMTSC# control output delay to TDMCLK | 0 | 2 | 0 | 2 | 0 | 2 | 0 | 2 |
| t44 | TDMFS setup time to TDMCLK | 6 | — | 4 | — | 4 | — | 4 | — |
| t45 | TDMFS hold time to TDMCLK | 2 | — | 2 | — | 2 | — | 2 | — |
| t46 | TDMDR data setup time to TDMCLK | 6 | — | 4 | — | 4 | — | 4 | — |
| t47 | TDMDR data hold time to TDMCLK | 2 | — | 2 | — | 2 | — | 2 | — |
| t48 | TDMDX data output delay to TDMCLK | 0 | 2 | 0 | 2 | 0 | 2 | 0 | 2 |

TABLE 15

TDM Delay Timing

| | | Programmable | |
|---|---|---|---|
| Time | Description | Min | Max |
| t49 | TDM Receive delay to TDMFS | 0 | 8T |
| t50 | TDM transmit delay to TDMFS | 0 | 8T |

*1T = TDMC',K cycle

Audio Interface

Figure 26:
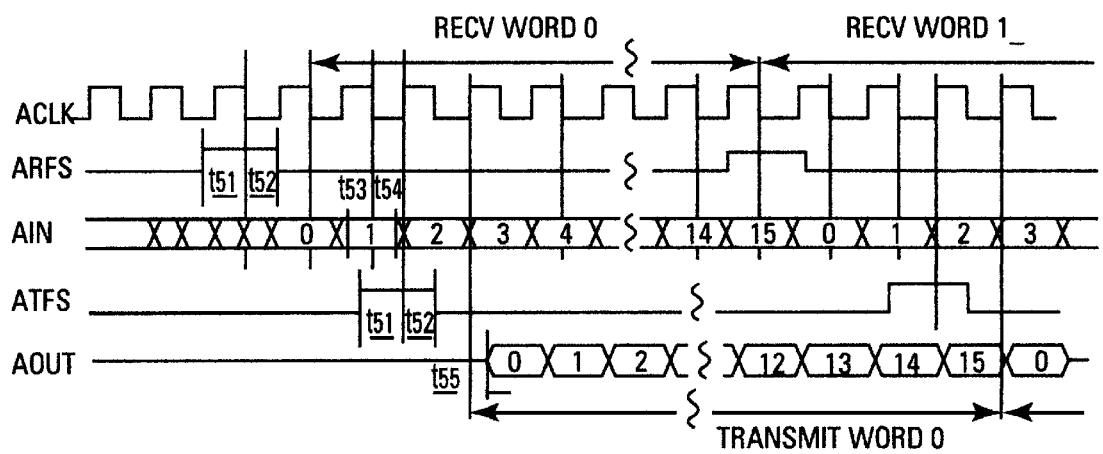

Audio interface 213 is a bidirectional serial port which carries audio data to and from VCP 110 and is capable of direct connection to the serial ports on Analog Devices 2101 DSPs and other DSPs with compatible ports. Audio interface 213 consists of a five-wire interface for data transfer at rates of up to 16 Mbits/s over a single-channel serial bus with a fixed word length of 16 bits. Audio interface 213 supports independent transmit and receive frame syncs with a fixed delay of one cycle of signal ACLK between the frame sync and the transmission or receipt of data. With "normal" framing, data is transmitted or received on the cycle after the frame sync is active. Data is transferred at the same rate as signal ACLK. FIG. 26 and Table B16 show the timing in ns of transfers through audio interface 213 for different signal CPUCLK frequency.

TABLE B16

Audio Interface Timing

| Time | Description | 20 MHz | | 30 MHz | | 33 MHz | | 40 MHz | |
|------|-------------|--------|-----|--------|-----|--------|-----|--------|-----|
| | | Min | Max | Min | Max | Min | Max | Min | Max |
| t11 | ACLK period | 100 | — | 62.5 | — | 62.5 | — | 62.5 | — |
| t51 | ATFS/ARFS setup time to ACLK | 6 | — | 4 | — | 4 | — | 4 | — |
| t52 | ATFS/ARFS hold time to ACLK | 2 | — | 2 | — | 2 | — | 2 | — |
| t53 | AIN setup time to ACLK | 6 | — | 4 | — | 4 | — | 4 | — |
| t54 | AIN hold time to ACLK | 2 | — | 2 | — | 2 | — | 2 | — |
| t55 | AOUT output delay time | 0 | 2 | 0 | 2 | 0 | 2 | 0 | 2 |

Host Interface

An external host can uses host interface 214 to control VCP 110 and to transfer user, audio and bit stream information. Host interface 214 implements a generic 16-bit parallel bus and has six registers, HOSTDMAPORTI HOSTVCXPORT, HOSTBGPORT, HOSTCTL, HOSTMASK, and HOSTIRQSTAT. Registers HOSTDMAPORT, HOSTVCXPORT, and HOSTBGPORT constitute three ports, a DMA port, a VCXI port, and a Debug port.

Host interface 214 allows communications between RISC processor 220 and an external host (if any). All registers in host interface 214 are aligned on 16-bit boundaries, and pins HA[2:0] provide a 16-bit word addresses. Register HOSTDMAPORT is a 16-bit register used for DMA data transferred between VCP 110 and the host device. Typically, register HOSTDMAPORT is used for high-speed or low-speed data multiplexed in the H.221 bit stream. Register HOSTVCXPORT is an 8-bit register for transfer of VCXI data between RISC processor 220 and the host device. Register HOSTBGPORT is an 8-bit register of transfer of debug data between RISC processor 220 and the host device.

Register HOSTCTL is an 8-bit control register. Bit 7 of register HOSTCTL is a host-to-RISC interrupt. The host device writing a "1" bit 7 generates a Host-to-RISC interrupt. Field Isel (bits 6-4) determines which of the DMA, VCXI and Debug ports contribute to pin HWRREQ. Pin HWRREQ provides a signal (DMATRE & Isel0)|(VCXTRE & Isel1)|(DBGTRE & Isel2). Field Osel (Bits 3-1) determines which of the DMA, VCXI and Debug ports contribute to pin HRDREQ. Pin HRDREQ provides a signal given by (DMADW & Osel0)|(VCXDW & Osel1)|(DBGDW & Osel2). The host writes a "1", to bit 0 to clear a RISC-to-Host interrupt.

Bits of register HOSTMASK determine if a condition causes a RISC-to-Host interrupt on pin HIRQ. If not, the interrupt status is still set in register HOSTIRQSTAT. The host sets bit 7 (EndianSel) if the host expects little endian data. Otherwise data is big endian. When bit 6 (DbugTREEn) is set to "1", the host is interrupted when the Debug port is waiting for data to be written by the host. When bit 5 (Dbugnn) is set to "1", the host is interrupted when the Debug port contains data which the host should read. When bit 4 (DMATREEn) is set to "1", the host is interrupted when the DMA port is waiting for data to be written by the host. When bit 3 (DMADWEn) is set to "1", the host is interrupted when the DMA port contains data which the host should read. When bit 2 (VCXTREEn) is set to "1", the host is interrupted when the VCXI port is waiting for data to be written by the host. When bit 1 (VCXIDWEn) is set to "1", the host is interrupted when the VCXI port contains data which the host should read. When bit 0 (R2HIrqEn) is set to "1", the RISC-to-Host interrupt causes an interrupt to the host.

Register HOSTIRQSTAT is an 8e-bit status register. When bit 6 (DbugTRE) is set to '1', the Debug port is waiting for data to be written by the Host. When bit 5 (DbugDW) is set to '1', the Debug port contains data which the host should read. When bit 4 (DMATRE) is set to '1', the DMA port is waiting for data to be written by the host. When bit 3 (DMADW) is set to '1', the DMA port contains data which the host should read. When bit 2 (VCXTRE) is set to '1', the VCXI port is waiting for the host to writ data. When bit 1 (VCXIDW) is set to '1', the VCXI port contains data which the Host should read. When bit 0 (R2HIrq) is set to '1', the RISC-to-Host interrupt has occurred.

Figure 27:
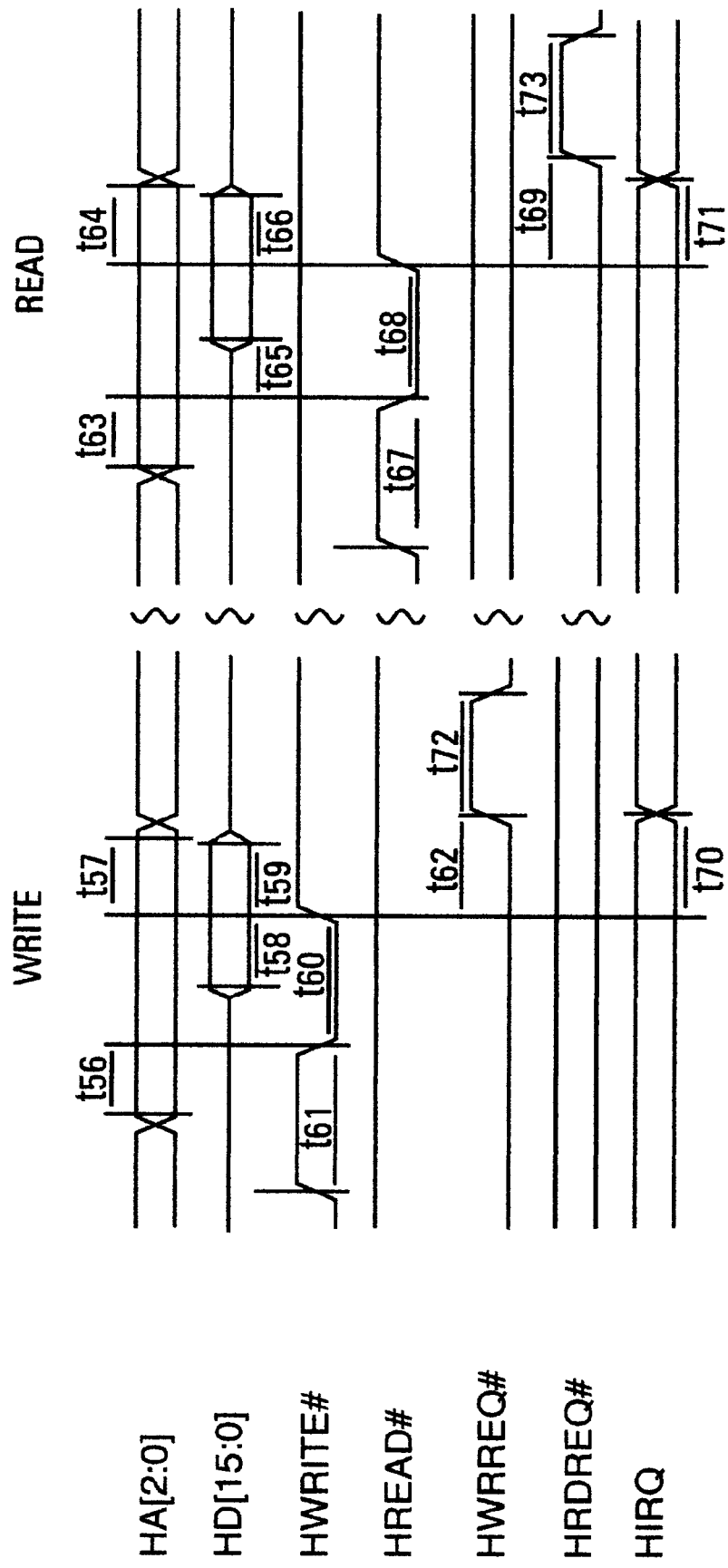

Host interface 214 is implemented with: a 16-bit data bus, HD[15:0]; a 3-bit address bus, HA[2:01]read. and write strobes, HREAD# AND HWRITE#; and read and write request lines HRDREQ# and HWRREQ#. Request lines HRDREQ# and HWRREQ# indicate when data ready for the host device to read or when the host device should write a data word. The lines can be programmed to indicate this for any combination of the TDM, VCXI or Debug ports. FIG. 27 and Table B17 illustrates the timing relationships of host interface 214.

TABLE B17

Host Interface Timing

| Time | Description | 20 MHz | | 30 MHz | | 33 MHz | | 40 MHz | |
|------|-------------|--------|-----|--------|-----|--------|-----|--------|-----|
| | | Min | Max | Min | Max | Min | Max | Min | Max |
| t56 | HA to HWRITE# setup time | 6 | — | 4 | — | 4 | — | 4 | — |
| t57 | HA to HWRITE# hold time | 2 | — | 2 | — | 2 | — | 2 | — |
| t58 | HD to HWRITE# setup time | 6 | — | 4 | — | 4 | — | 4 | — |
| t59 | HD to HWRITE# hold time | 2 | — | 2 | — | 2 | — | 2 | — |
| t60 | HWRITE# pulse width high | 30 | — | 30 | — | 30 | — | 30 | — |

TABLE B17-continued

Host Interface Timing

| Time | Description | 20 MHz Min | 20 MHz Max | 30 MHz Min | 30 MHz Max | 33 MHz Min | 33 MHz Max | 40 MHz Min | 40 MHz Max |
|---|---|---|---|---|---|---|---|---|---|
| t61 | HWRITE# pulse width high | 30 | — | 30 | — | 30 | — | 30 | — |
| t62 | HWRREQ# to HWRITE# output delay | 0 | 8 | 0 | 8 | 0 | 8 | 0 | 8 |
| t63 | HA to HREAD# setup time | 6 | — | 4 | — | 4 | — | 4 | — |
| t64 | HA to HREAD# hold time | 2 | — | 2 | — | 2 | — | 2 | — |
| t65 | HD to HREAD# output delay | 0 | 6 | 0 | 4 | 0 | 4 | 0 | 4 |
| t66 | HD to HREAD# hold time | 2 | — | 2 | — | 2 | — | 2 | — |
| t67 | HREAD# pulse width high | 30 | — | 30 | — | 30 | — | 30 | — |
| t68 | HREAD# pulse width low | 30 | — | 30 | — | 30 | — | 30 | — |
| t69 | HRDREQ# to HREAD# output delay | 0 | 8 | 0 | 8 | 0 | 8 | 0 | 8 |
| t70 | HIRQ to HWRITE# output delay | 0 | 8 | 0 | 8 | 0 | 8 | 0 | 8 |
| t71 | HIRQ to HWRITE# output delay | 0 | 8 | 0 | 8 | 0 | 8 | 0 | 8 |
| t72 | HWRREQ# pulse width high | 150 | see note | 100 | see note | 91 | see note | 75 | see note |
| t73 | HDREQ# pulse width high | 150 | see note | 100 | see note | 91 | see note | 75 | see note |

Note: The pulse width high time of HRDREQ# (t73) and HWRREQ# (t72) is well defined only as a minimum value (no less than three cycles of signal CPUCLK), the maximum value is software dependent.
DMA channel bandwidth internal to VCP 110 depends upon presence, priority, and status of other DMA operations in VCP 110. Data bus 204 may be occupied by for execution of a RISC instruction. For example, load and store instructions use a memory cycle for RISC processor 220 I/O and block DMA. Even for burst transfers where the file size has been negotiated in advance, a maximum period between Host LMA requests is specified.

We claim:

1. A video communications processing arrangement for processing a data signal received from one or more communication channels, the data signal including at least a serial bit stream of non-byte aligned audio data and video data, the video communications processing arrangement comprising:

a communications interface configured to receive the data signal;

a programmable supervisory processor, the supervisory processor generating a configuration control signal in response to communication channel parameters;

a reconfigurable parsing circuit coupled to receive the data signal from the communications interface, the parsing circuit being configured, in response to the configuration control signal, to separate the video data and the audio data in the data signal in accordance with the communication channel parameters; and a programmable video processor configured and arranged to process the separated video data.

2. The video communications processing arrangement of claim 1, wherein the data signal is time division multiplexed (TDM) and the communications interface comprising a TDM interface.

3. The video communications processing arrangement of claim 1, wherein the programmable video processor is further configured and arranged to process the separated audio data.

4. The video communications processing arrangement of claim 1, wherein the supervisory processor, the video processor and the parsing circuit are formed within a single chip.

5. The video communications processing arrangement of claim 1, wherein the communication channel parameters comprise a communication protocol used to transmit the data stream on the communications channel.

6. The video communications processing arrangement of claim 4, further comprising a memory, accessible by the supervisor processor, the video processor and the parsing circuit, for temporarily storing the separated video data and audio data.

7. The video communications processing arrangement of claim 6, wherein the memory is external to the single chip.

8. The video communications processing arrangement of claim 7, further comprising a direct memory access (DMA) controller formed on the chip with the supervisory processor, the video processor, and the parsing circuit, to control access to the memory, the memory functioning as FIFO buffers for the supervisory processor, the video processor, and the parsing circuit.

9. A video communications processing arrangement for processing a data signal received from one or more communication channels, according to claim 1, wherein the programmable supervisory processor is programmable independently from the programmability of the programmable video processor.

10. A video communications processing arrangement for processing a data signal received from one or more communication channels, according to claim 1, the programmable video processor is programmable independently from the programmability of the programmable supervisory processor.

11. A video communications processing arrangement for processing a data signal received from one or more communication channels, according to claim 1, wherein the supervisor processor, the video processor and the parsing circuit are implemented on a single chip, and further comprising an external SRAM circuit, and a RISC-DMA circuit formed with the supervisory processor, the video processor, and the parsing circuit, to manage data communication with the external SRAM circuit.

12. A video communications processing arrangement for processing a data signal received from one or more communication channels, according to claim 11, wherein the single chip further includes an audio port, a TDM port, a host port, a Huffman data processing circuit.

13. A video communications processing arrangement for processing a data signal received from one or more communication channels, according to claim 12, wherein the RISC-DMA circuit manages data flow between the external SRAM circuit and the audio port, the TDM port, the host port, and the Huffman data processing circuit.

14. A video communications processing method for processing a data signal received in a video communications processing arrangement, according to claim 1, wherein the supervisor processor, the video processor and the parsing circuit are implemented on a single chip along with a boot ROM storing a monitor application for self-booting operation.

15. A video communications processing method for processing a data signal received in a video communications processing arrangement, according to claim 1, further comprising a RISC circuit formed with the supervisory processor and the video processor, and further including a bit-manipulating non-programmable circuit, responsive to data passed from the RISC circuit, adapted to find frame alignment and to perform data validation.

16. A video communications processing method for processing a data signal received in a video communications processing arrangement including a supervisory processor and a video processor from one or more communication channels, the data signal including at least a serial bit stream of non-byte aligned audio data and video data, the video communications processing method comprising:

provinding the data signal received from the communication channels to the supervisory processor;

identifying, using the supervisory processor, communication channel parameters for the data signal;

parsing the data signal to separate the video data and the audio data in the data signal based on the identified communication channel parameters; and storing the separated video data in a memory accessible by the video processor for processing thereby.

17. A video communications processing arrangement for processing a data signal received from one or more communication channels, the data signal including at least a serial bit stream of non-byte aligned audio data and video data, comprising:

means for interfacing with the communication channel to receive the data signal;

supervisory processing means for identifying communication channel parameters for the data signal and for generating a configuration control signal indicative of the communication channel parameters;

means, configured in response to the configuration control signal, for parsing the data signal to separate the video data from the audio data;

a memory for storing the separated video data; and video processing means, coupled to the memory, for processing the separated video data.

18. A video communications processing arrangement for processing a data signal received from one or more communication channels, according to claim 17, wherein at least one of the supervisory processing means and the video processing means is independently programmable relative to any programmability of the other.

19. A video communications processing arrangement for processing a data signal received from one or more communication channels, according to claim 17, wherein each of the supervisor processor and the video processor is programmable, and wherein the supervisor processor, the video processor and the parsing circuit are implemented on a single chip, along with a serial audio port, a serial communication port, a programmable audio processor, a programmable video-in interface, a programmable video-out interface, and an embedded ROM for self-booting operation.

20. A video communications processing arrangement for processing a data signal received from one or more communication channels, according to claim 17, wherein the supervisor processor, the video processor and the parsing circuit are implemented with a RISC-DMA circuit on a single chip, along with separately accessible internal SRAM and DRAM busses, wherein the RISC-DMA circuit manages transfer of data between an SRAM circuit and a DRAM circuit, the SRAM circuit and the DRAM circuit are respectively connected to the internal SRAM and DRAM busses.

* * * * *

UNITED STATES PATENT AND TRADEMARK OFFICE
CERTIFICATE OF CORRECTION

PATENT NO. : 5,982,459                              Page 1 of 2

DATED : November 9, 1999

INVENTOR(S) : Fandrianto et al.

It is certified that error appears in the above-identified patent and that said Letters Patent is hereby corrected as shown below:

column 1, line 5, "08/457,526" should read --08/457,516--.
column 1, line 6, "applications(s)" should read --application(s)--.
column 1, line 17, "Ad" should be deleted.
column 6, line 25, "LWRUL" should read --LWRLH--.
column 7, line 38-39, "requirements lost" should read --requirements. Host--.
column 10, line 59, "BEC" should read --BCH--.
column 12, line 30, the sentence beginning with "Returning" should start a new paragraph.
column 18, line 16, "YTJV" should read --YUV--.
In Table A1, the third to last line should read --Reg(Src1)]; and--.
In Table B1, in the definition for HD[15:0], "Its" should read --It--.
In Table B1, in the definition for VSNCCAM, "of" should read --or--.
column 21, line 33, "ti" should read --t1--.
column 29, line 6, "lo" should read --110--.
In Table B14 (TDM Interface Timing), the Min. at 33 MHz for t16 should read --62.5--.
column 30, line 50, "Devices" should read --Devices'--.
column 31, line 20, "HOSTDMAPORTT" should read --HOSTDMAPORT--.
column 32, line19, "Dbugnn" should read --DbugWEn--.
column 32, line32, "8e-bit" should read --8-bit--.
column 32, line 40, "writ" should read --write--.

UNITED STATES PATENT AND TRADEMARK OFFICE
CERTIFICATE OF CORRECTION

PATENT NO. : 5,982,459
DATED : November 9, 1999
INVENTOR(S) : Fandrianto, et al.

It is certified that error appears in the above-identified patent and that said Letters Patent is hereby corrected as shown below:

column 32, line 51, "TDM" should read --DMA--.
In Table B17, the description for t60 should read --HWRITE# pulse width low--.

Signed and Sealed this

Seventeenth Day of April, 2001

*Attest:*

NICHOLAS P. GODICI

*Attesting Officer*  Acting Director of the United States Patent and Trademark Office